US007493763B2

(12) United States Patent
Klochko et al.

(10) Patent No.: US 7,493,763 B2
(45) **Date of Patent: *Feb. 24, 2009**

(54) LNG-BASED POWER AND REGASIFICATION SYSTEM

(75) Inventors: Marat Klochko, Yavne (IL); Uri Kaplan, Moahav Galia (IL); Danny Batscha, Kiriat Ono (IL); Nadav Amir, Rehovot (IL); David Machlev, Tel Aviv (IL); Lucien Y. Bronicki, Yavne (IL)

(73) Assignee: Ormat Technologies, Inc., Reno, NV (US)

( * ) Notice: Subject to any disclaimer, the term of this patent is extended or adjusted under 35 U.S.C. 154(b) by 500 days.

This patent is subject to a terminal disclaimer.

(21) Appl. No.: 11/110,935

(22) Filed: Apr. 21, 2005

(65) Prior Publication Data

US 2006/0236699 A1 Oct. 26, 2006

(51) Int. Cl.
*F03G 7/00* (2006.01)

(52) U.S. Cl. ........................... 60/641.7; 60/651; 60/671

(58) Field of Classification Search ................ 60/641.1, 60/641.6, 641.7, 651, 671
See application file for complete search history.

(56) References Cited

U.S. PATENT DOCUMENTS 4,429,536 A 2/1984 Nozawa
4,562,995 A * 1/1986 Enjo et al. .................... 252/67
5,457,951 A 10/1995 Johnson et al.
5,615,561 A 4/1997 Houshmand et al.
5,687,570 A 11/1997 Bronicki et al.
6,336,316 B1 1/2002 Fujii et al.
6,367,258 B1 * 4/2002 Wen et al. .................. 60/641.7
6,960,839 B2 11/2005 Zimron et al.

OTHER PUBLICATIONS

U.S. Appl. No. 11/876,450, filed Oct. 22, 2007, Amir et al.
J. Maertens, "Design of Rankine Cycles for Power generation from evaporating LNG", Rev. Int. Froid/Int. J. Refrig., vol. 9 May 1986, pp. 137-143.
"Energy recovery on LNG import terminals ERoS RT project" Snecma Moteurs, Mar. 2005, pp. 1-5.

* cited by examiner

*Primary Examiner*—Hoang M Nguyen
(74) *Attorney, Agent, or Firm*—Oblon, Spivak, McClelland, Maier & Neustadt, P.C.

(57) ABSTRACT

The present invention provides a power and regasification system based on liquefied natural gas (LNG), comprising a vaporizer by which liquid working fluid is vaporized, said liquid working fluid being LNG or a working fluid liquefied by means of LNG; a turbine for expanding the vaporized working fluid and producing power; heat exchanger means to which expanded working fluid vapor is supplied, said heat exchanger means also being supplied with LNG for receiving heat from said expanded fluid vapor, whereby the temperature of the LNG increases as it flows through the heat exchanger means; a conduit through which said working fluid is circulated from at least the inlet of said vaporizer to the outlet of said heat exchanger means; and a line for transmitting regasified LNG.

35 Claims, 22 Drawing Sheets

B. CLOSED POWER CYCLE

A. OPEN POWER CYCLE

B. CLOSED POWER CYCLE

LNG-BASED POWER AND REGASIFICATION SYSTEM

FIELD OF THE INVENTION

The present invention relates to the field of power generation. More particularly, the invention relates to a system which both utilizes liquefied natural gas for power generation and re-gasifies the liquefied natural gas.

BACKGROUND OF THE INVENTION

In some regions of the world, the transportation of natural gas through pipelines is uneconomic. The natural gas is therefore cooled to a temperature below its boiling point, e.g. −160° C., until becoming liquid and the liquefied natural gas (LNG) is subsequently stored in tanks. Since the volume of natural gas is considerably less in liquid phase than in gaseous phase, the LNG can be conveniently and economically transported by ship to a destination port.

In the vicinity of the destination port, the LNG is transported to a regasification terminal, whereat it is reheated by heat exchange with sea water or with the exhaust gas of gas turbines and converted into gas. Each regasification terminal is usually connected with a distribution network of pipelines so that the regasified natural gas may be transmitted to an end user. While a regasification terminal is efficient in terms of the ability to vaporize the LNG so that it may be transmitted to end users, there is a need for an efficient method for harnessing the cold potential of the LNG as a cold sink for a condenser to generate power.

Use of Rankine cycles for power generation from evaporating LNG are considered in "Design of Rankine Cycles for power generation from evaporating LNG", Maertens, J., International Journal of Refrigeration, 1986, Vol. 9, May. In addition, further power: cycles using LNG/LPG (liquefied petroleum gas) are considered in U.S. Pat. No. 6,367,258. Another power cycle utilizing LNG is considered in U.S. Pat. No. 6,336,816. More power cycles using LNG are described in "Energy recovery on LNG import terminals ERoS RT project" by Snecma Moteurs, made available at the Gastech 2005, The 21$^{st}$ International Conference & Exhibition for the LNG, LPG and Natural Gas Industries,—14/17 Mar., 2005 Bilbao, Spain.

On the other hand, a power cycle including a combined cycle power plant and an organic Rankine cycle power plant using the condenser of the steam turbine as its heat source is disclosed in U.S. Pat. No. 5,687,570, the disclosure of which is hereby included by reference.

It is an object of the present invention to provide an LNG-based power and regasification system, which utilizes the low temperature of the LNG as a cold sink for the condenser of the power system in order to generate electricity or produce power for direct use.

Other objects and advantages of the invention will become apparent as the description proceeds.

SUMMARY OF THE INVENTION

The present invention provides a power and regasification system based on liquefied natural gas (LNG), comprising a vaporizer by which liquid working fluid is vaporized, said liquid working fluid being LNG or a working fluid liquefied by means of LNG; a turbine for expanding the vaporized working fluid and producing power; heat exchanger means to which expanded working fluid vapor is supplied, said heat exchanger means also being supplied with LNG for receiving heat from said expanded fluid vapor, whereby the temperature of the LNG increases as it flows through the heat exchanger means; a conduit through which said working fluid is circulated from at least the inlet of said vaporizer to the outlet of said heat exchanger means; and a line for transmitting regasified LNG.

Power is generated due to the large temperature differential between cold LNG, e.g. approximately −160° C., and the heat source of the vaporizer. The heat source of the vaporizer may be sea water at a temperature ranging between approximately 5° C. to 20° C. or heat such as an exhaust gas discharged from a gas turbine or low pressure steam exiting a condensing steam turbine.

The system further comprises a pump for delivering liquid working fluid to the vaporizer.

The system may further comprise a compressor for compressing regasified LNG and transmitting said compressed regasified LNG along a pipeline to end users. The compressor may be coupled to the turbine. The regasified LNG may also be transmitted via the line to storage.

In one embodiment of the invention, the power system is a closed Rankine cycle power system such that the conduit further extends from the outlet of the heat-exchanger means to the inlet of the vaporizer and the heat exchanger means is a condenser by which the LNG condenses the working fluid exhausted from the turbine to a temperature ranging from approximately −100° C. to −120° C. The working fluid is preferably organic fluid such as ethane, ethene or methane or equivalents, or a mixture of propane and ethane or equivalents. The temperature of the LNG heated by the turbine exhaust is preferably further increased by means of a heater.

In another embodiment of the invention, the power system is an open cycle power system, the working fluid is LNG, and the heat exchanger means is a heater for re-gasifying the LNG exhausted from the turbine.

The heat source of the heater may be sea water at a temperature ranging between approximately 5° C. to 20° C. or waste heat such as an exhaust gas discharged from a gas turbine.

DETAILED DESCRIPTION OF PREFERRED EMBODIMENTS

The present invention is a power and regasification system based on liquid natural gas (LNG). While transported LNG, e.g. mostly methane, is vaporized in the prior art at a regasification terminal by being passed through a heat exchanger, wherein sea water or another heat source e.g. the exhaust of a gas turbine heats the LNG above its boiling point, an efficient method for utilizing the cold LNG to produce power is needed. By employing the power system of the present invention, the cold temperature potential of the LNG serves as a cold sink of a power cycle. Electricity or power is generated due to the large temperature differential between the cold LNG and the heat source, e.g. sea water.

Figure 1:
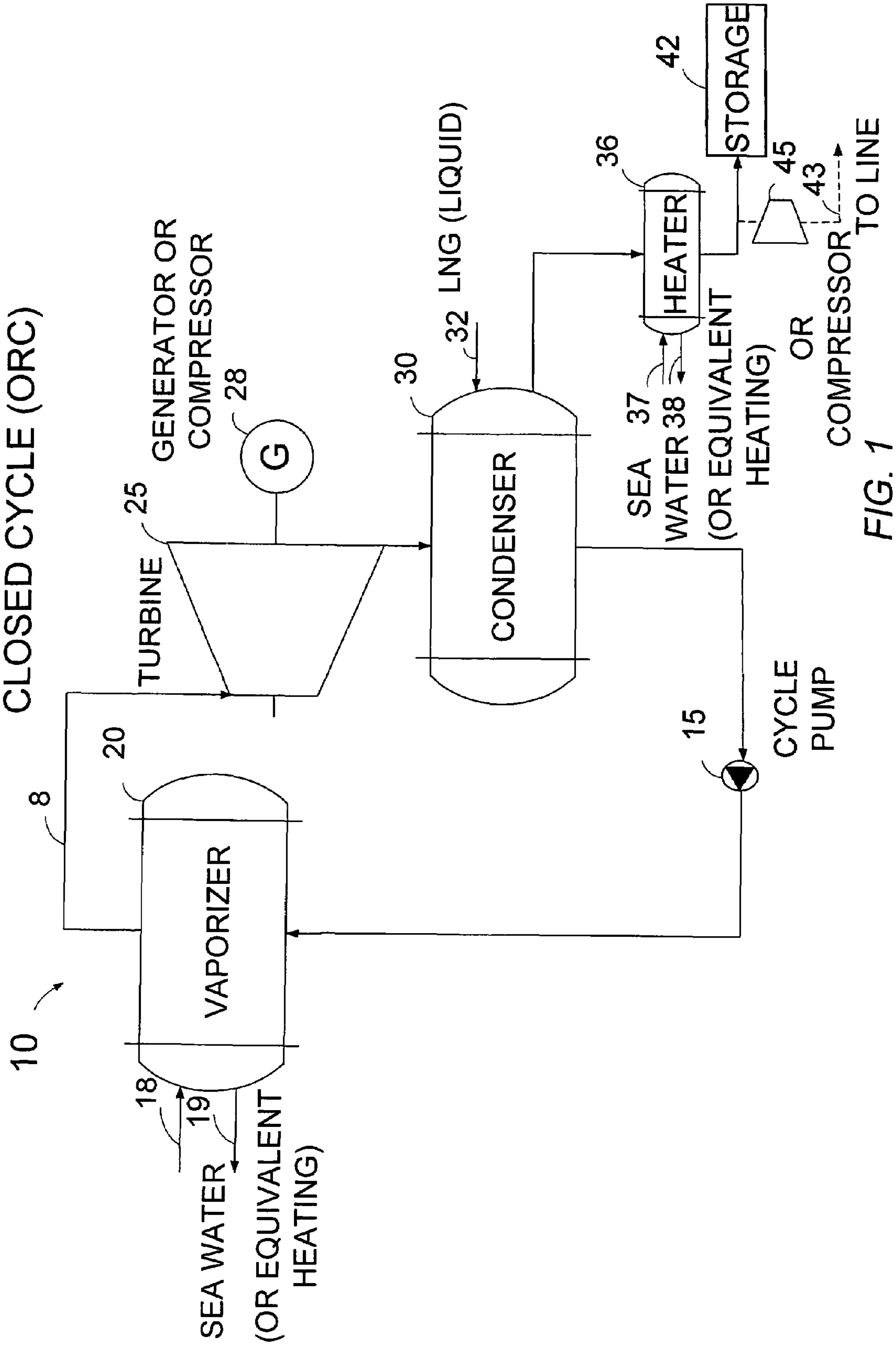
FIG. 1 is a schematic arrangement of a closed cycle power system in accordance with one embodiment of the invention.
Figure 2:
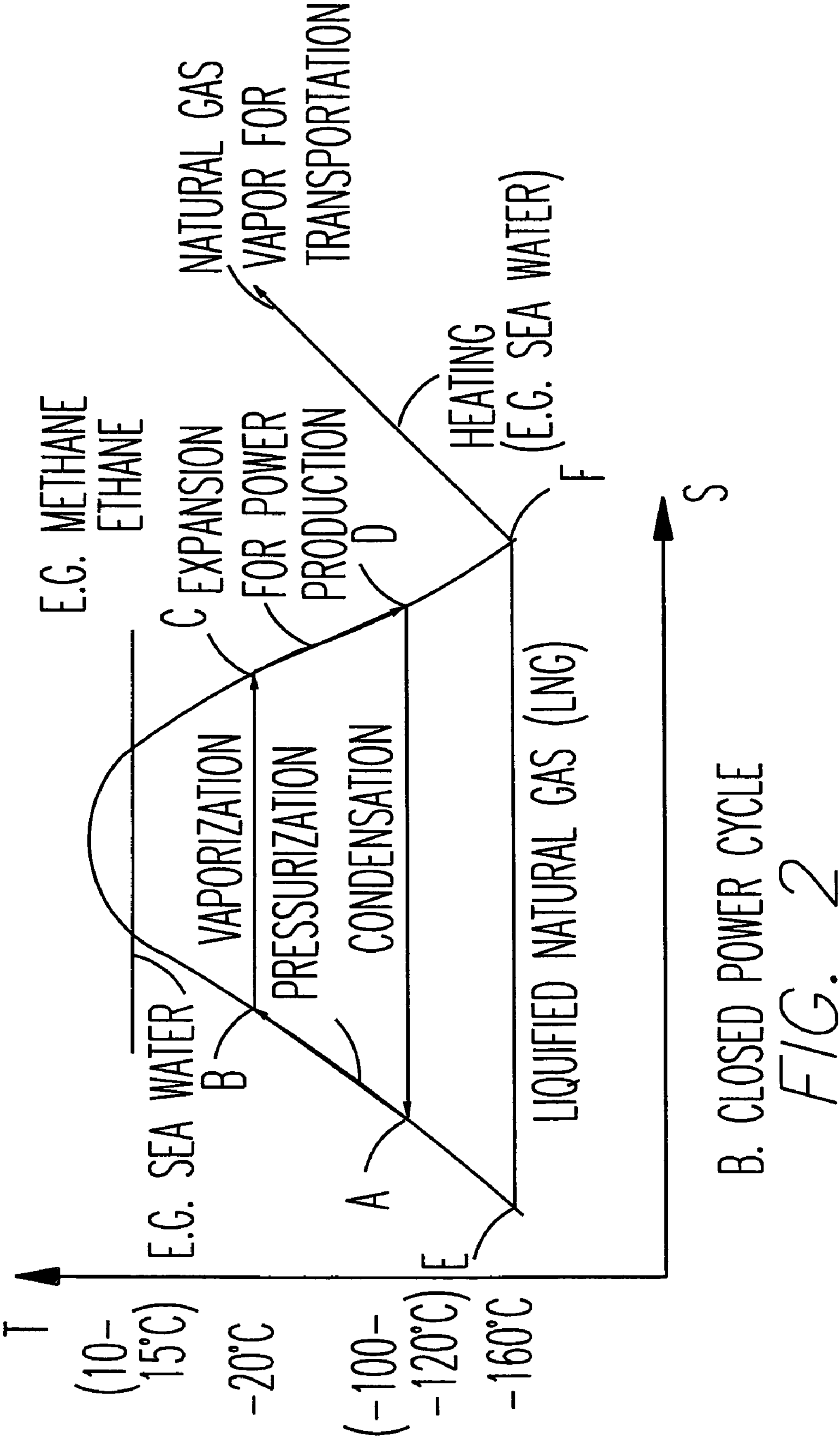
FIG. 2 is a temperature-entropy diagram of the closed cycle power system of FIG. 1.

FIGS. 1 and 2 illustrate one embodiment of the invention, wherein cold LNG serves as the cold sink medium in the condenser of a closed Rankine cycle power plant. FIG. 1 is a schematic arrangement of the power system and FIG. 2 is a temperature-entropy diagram of the closed cycle.

The power system of a closed Rankine cycle is generally designated as numeral 10. Organic fluid such as ethane, ethene or methane or an equivalent, is the preferred working fluid for power system 10 and circulates through conduits 8. Pump 15 delivers liquid organic fluid at state A, the temperature of which ranges from about −80° C. to −120° C., to vaporizer 20 at state B. Sea water in line 18 at an average temperature of approximately 5-20° C. introduced to vaporizer 20 serves to transfer heat to the working fluid passing therethrough (i.e. from state B to state C). The temperature of the working fluid consequently rises above its boiling point to a temperature of approximately −10 to 0° C., and the vaporized working fluid produced is supplied to turbine 25. The sea water discharged from vaporizer 20 via line 19 is returned to the ocean. As the vaporized working fluid is expanded in turbine 25 (i.e. from state C to state D), power or preferably electricity is produced by generator 28 operated to turbine 25. Preferably, turbine 25 rotates at about 1500 RPM or 1800 RPM. LNG in line 32 at an average temperature of approximately −160° C. introduced to condenser 30 (i.e. at state E) serves to condense the working fluid exiting turbine 25 (i.e. from state D to state A) corresponding to a liquid phase, so that pump 15 delivers the liquid working fluid to vaporizer 20. Since the LNG lowers the temperature of the working fluid to a considerably low temperature of about −80° C. to −120° C., the recoverable energy available by expanding the vaporized working fluid in turbine 25 is relatively high.

The temperature of LNG in line 32 (i.e. at state F) increases after heat is transferred thereto within condenser 80 by the expanded working fluid exiting turbine 25, and is further increased by sea water, which is passed through heater 36 via line 37. Sea water discharged from heater 36 via line 38 is returned to the ocean. The temperature of the sea water introduced into heater 36 is usually sufficient to re-gasify the LNG, which may held in storage vessel 42 or, alternatively, be compressed and delivered by compressor 46 through line 43 to a pipeline for distribution of vaporized LNG to end users. Compressor 40 for re-gasifying the natural gas prior to transmission may be driven by the power generated by turbine 25 or, if preferred driven by electricity produced by electric generator 25.

When sea water is not available or not used or not suitable for use, heat such as that contained in the exhaust gas of a gas turbine may be used to transfer heat to the working fluid in vaporizer 20 or to the natural gas directly or via a secondary heat transfer fluid (in heater 36).

Figure 3:
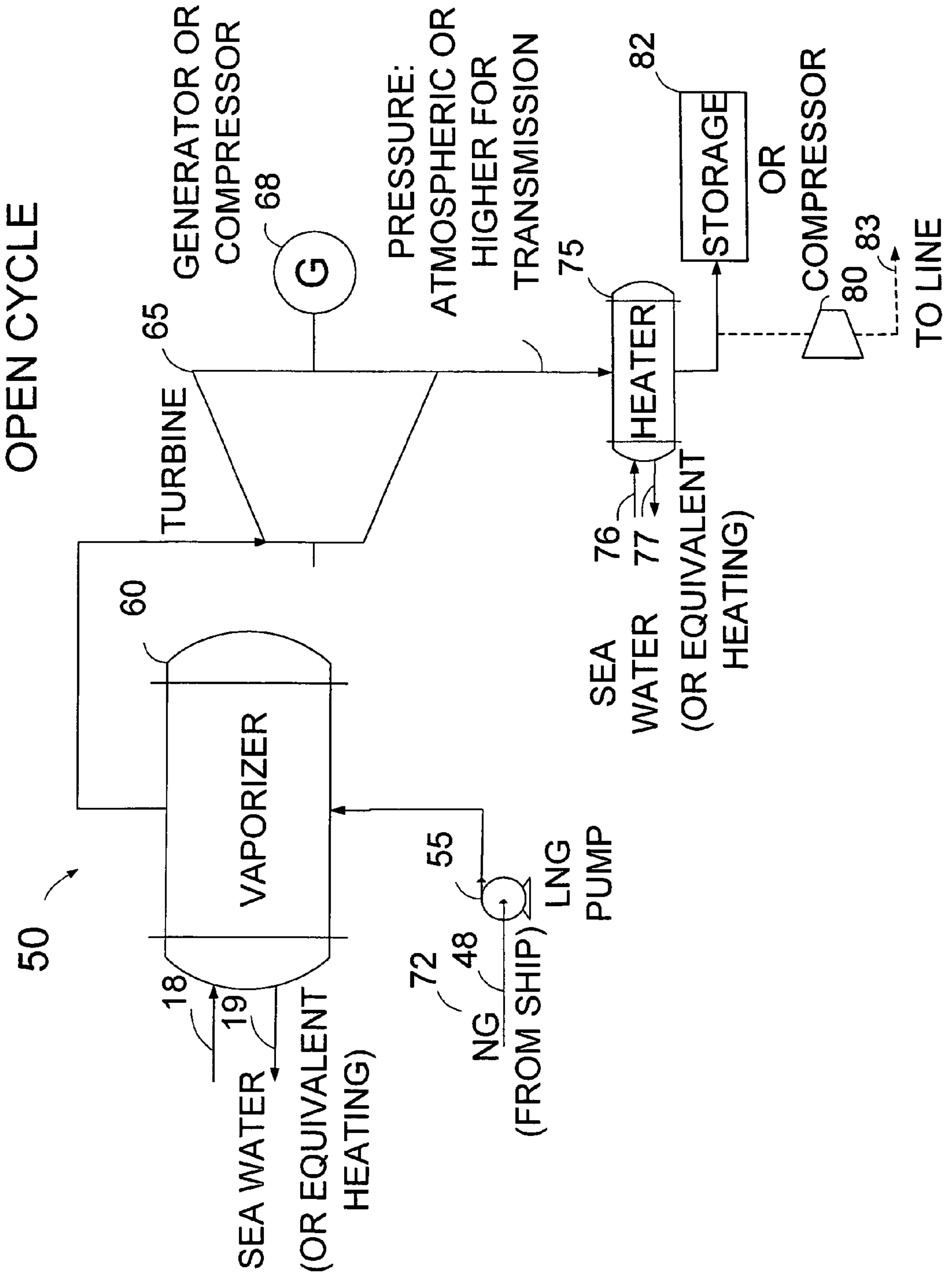
FIG. 3 is a schematic arrangement of an open cycle power system in accordance with another embodiment of the invention.
Figure 4:
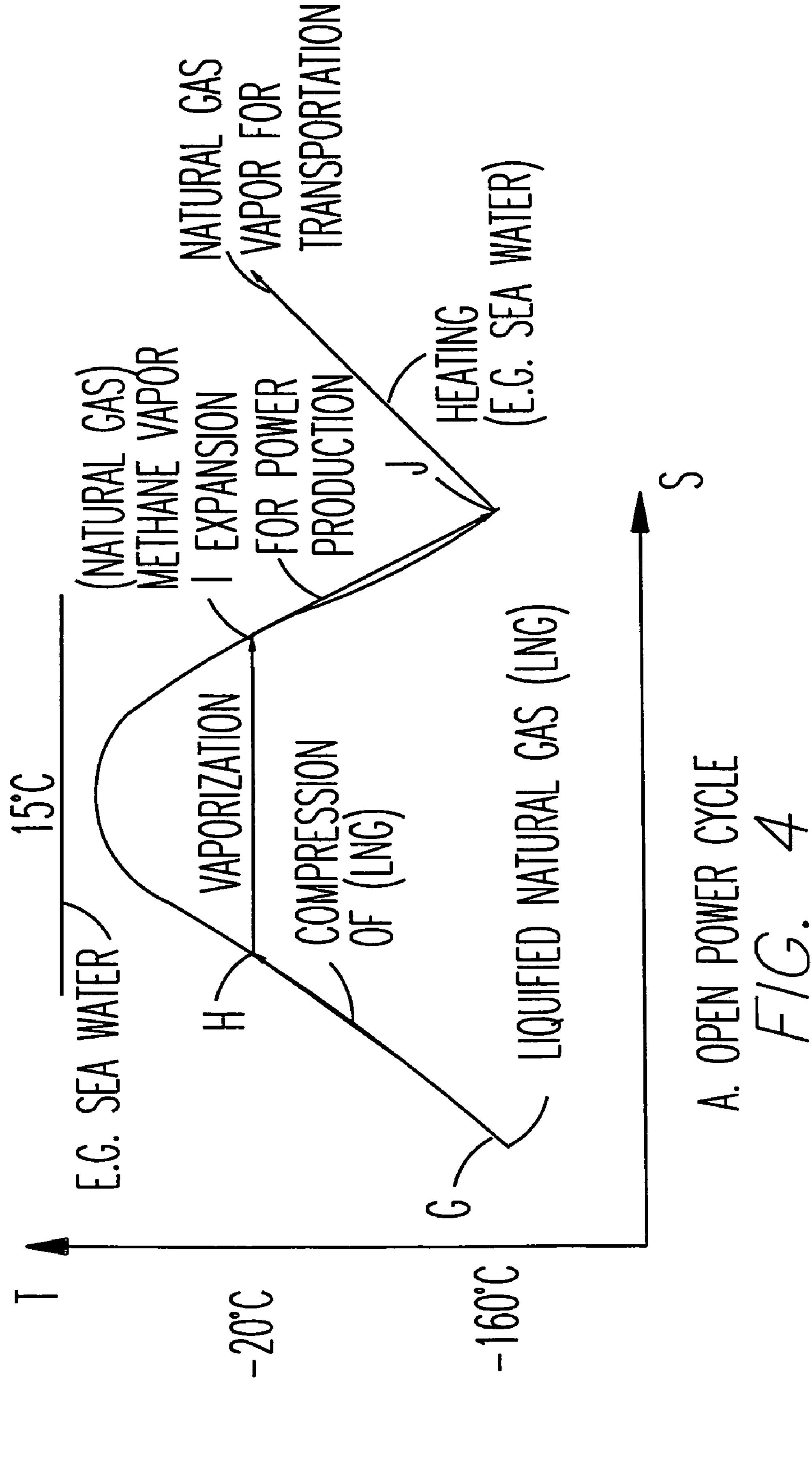
FIG. 4 is a temperature-entropy diagram of the open cycle power system of FIG. 3.

FIGS. 3 and 4 illustrate another embodiment of the invention, wherein LNG is the working fluid of an open cycle power plant. FIG. 3 is a schematic arrangement of the power system and FIG. 4 is a temperature-entropy diagram of the open cycle.

The power system of an open turbine-based cycle is generally designated as numeral 50. LNG 72, e.g. transported by ship to a selected destination, is the working fluid for power system 50 and circulates through conduits 48. Pump 56 delivers cold LNG at state G, the temperature of which is approximately −160° C., to vaporizer 60 at state H. Sea water at an average temperature of approximately 5-20° C. introduced via line 18 to vaporizer 60 serves to transfer heat to the LNG passing therethrough from state H to state I. The temperature of the LNG consequently rises above its boiling point to a temperature of approximately −10 to 0° C., and the vaporized LNG produced is supplied to turbine 65. The sea water is discharged via line 19 from vaporizer 60 is returned to the ocean. As the vaporized LNG is expanded in turbine 65 from state I to state J, power or preferably electricity is produced by generator 68 coupled to turbine 65. Preferably, turbine 65 rotates at 1500 RPM or 1800 RPM. Since the LNG at state G has a considerably low temperature of −160° C. and is subsequently pressurized by pump 65 from state G to state H so that high pressure vapor is produced in vaporizer 60, the energy in the vaporized LNG is relatively high and is utilized via expansion in turbine 65.

The temperature of LNG vapor at state J, after expansion within turbine 65, is increased by transferring heat thereto from sea water, which is supplied to, via line 76, and passes through heater 75. The sea water discharged from heater 75 via line 77 and returned to the ocean The temperature of sea water introduced to heater 75 is sufficient to heat the LNG vapor, which may held in storage 82 or, alternatively, be compressed and delivered by compressor 86 through line 83 to a pipeline for distribution of vaporized LNG to end users. Compressor 80 which compresses the natural gas prior to transmission may be driven by the power generated by turbine 65 or, if preferred, driven by electricity produced by electric generator 68. Alternatively, the pressure of the vaporized natural gas discharged from turbine 65 may be sufficiently high so that the natural gas which is heated in heater 75 can be transmitted through a pipeline without need of a compressor.

When sea water is not available or not used, heat such as heat contained in the exhaust gas of a gas turbine may be used to transfer heat to the natural gas in vaporizer 60 or in heater 75 or via a secondary heat transfer fluid.

Figure 5:
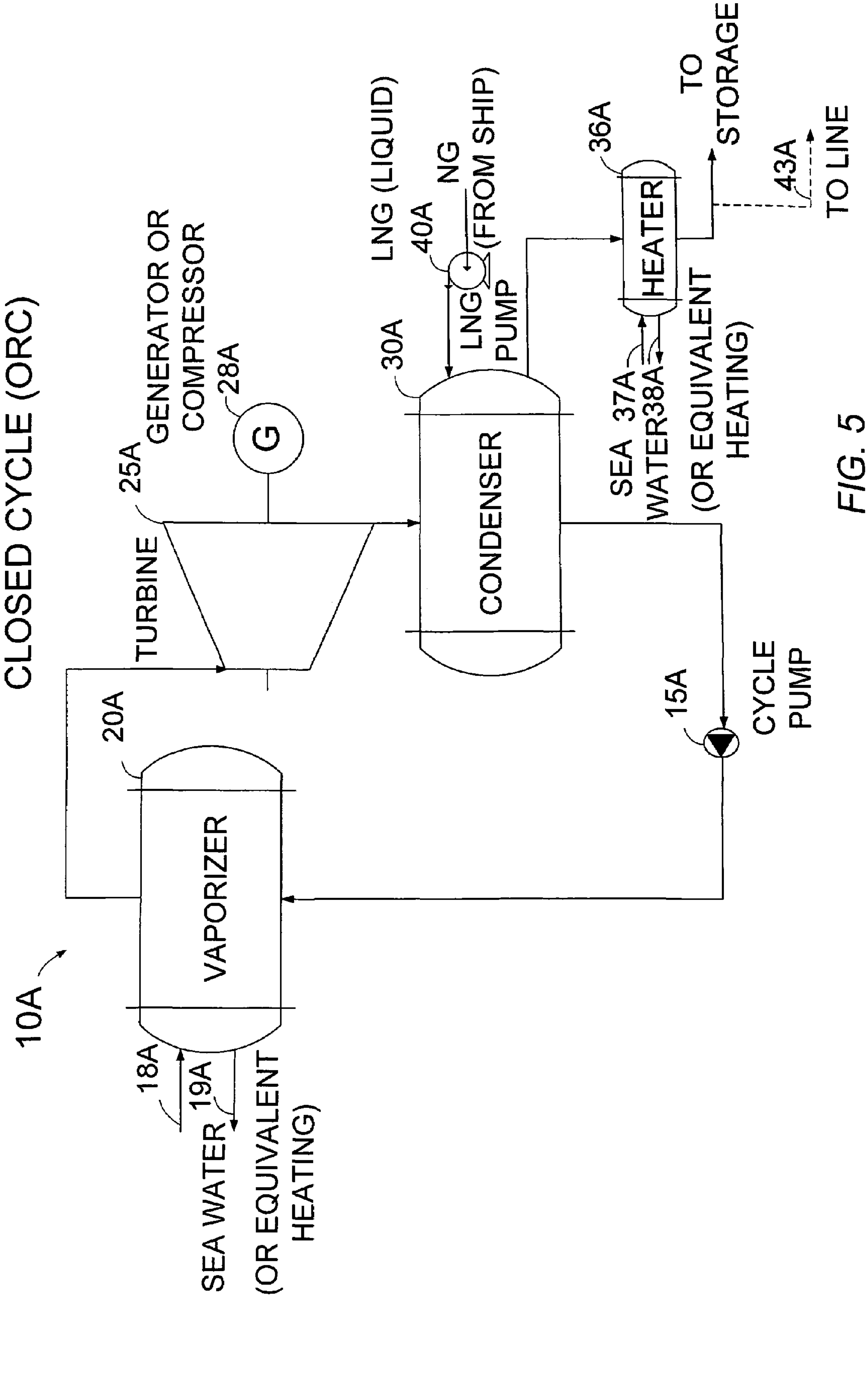
FIG. 5 is a schematic arrangement of a closed cycle power system in accordance with a further embodiment of the invention.
Figure 6:
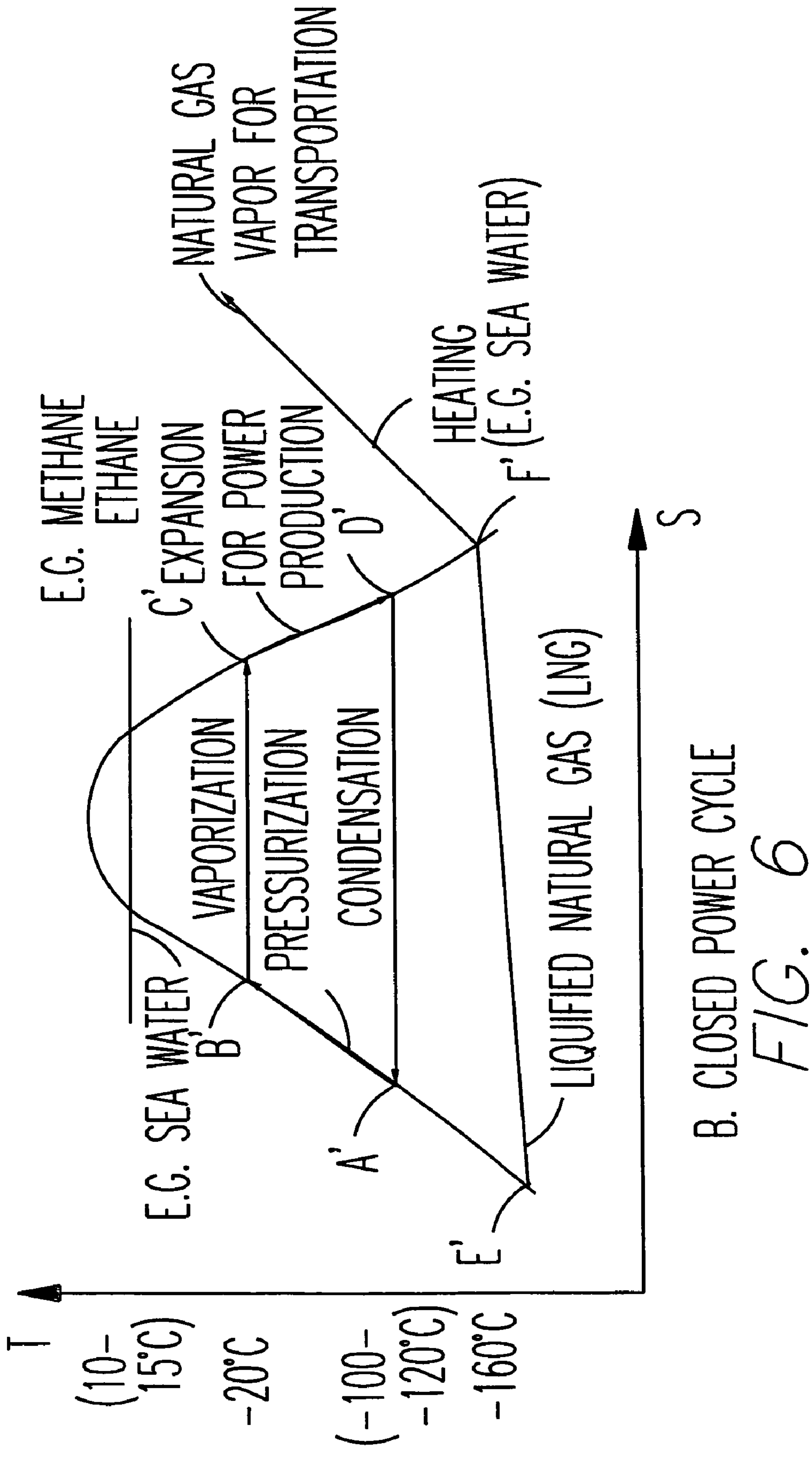
FIG. 6 is a temperature-entropy diagram of the closed cycle power system of FIG. 5.
Figure 7:
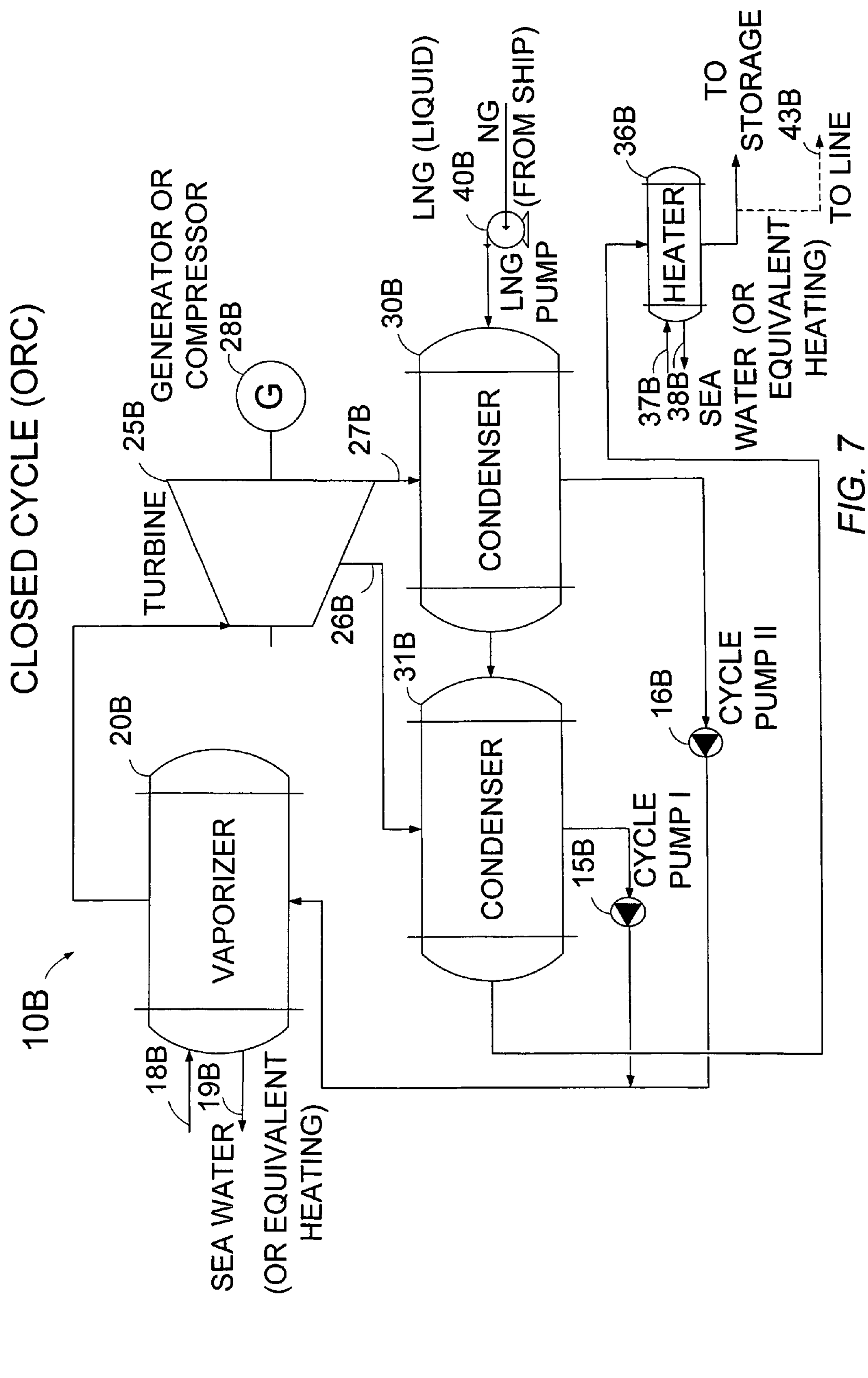
FIG. 7 is a schematic arrangement of a two pressure level closed cycle power system in accordance with a further embodiment of the invention.

Turning to FIG. 5, a further embodiment designated 10B of a closed cycle power system (similar to the embodiment described with reference to FIG. 1) is shown, wherein LNG pump 40A is used to pressurize the LNG prior to supplying it to condenser 30A to a pressure, e.g. about 80 bar, for producing a pressure for the re-gasified LNG suitable for supply via line 43 to a pipeline for distribution of vaporized LNG to end users. Pump 40B is used rather than compressor in the embodiment shown in FIG. 1. Basically, the operation of the present embodiment is similar to the operation of the embodiment of the present invention described with reference to FIGS. 1 and 2. Consequently, this embodiment is more efficient. Preferably, turbine 25B included in this embodiment, rotates at 1500 RPM or 1800 RPM. Furthermore, a mixture of propane and ethane or equivalents is the preferred working fluid for closed organic Rankine power system in this embodiment. However, ethane, ethene or other suitable organic working fluids can also be used in this embodiment. This is because the cooling curve of the propane/ethane mixture organic working fluid in the condenser 30A is more suited to the heating curve of LNG at such high pressures enabling the LNG cooling source to be used more effectively (see FIG. 6). However, if preferred, a dual pressure organic Rankine cycle using a single organic working fluid e.g. preferably ethane, ethene or an equivalent, can be used here wherein two different expansion levels and also two condensers can be used (see FIG. 7). As can be seen, expanded organic vapors are extracted from turbine 25B in an intermediate stage via line 26B and supplied to condenser 31B wherein organic working fluid condensate is produced. In addition, further expanded organic vapors exit turbine 25B via line 27B and are supplied to further condenser 30B wherein further organic working fluid condensate is produced. Preferably, turbine 25B rotates at 1500 RPM or 1800 RPM. Condensate produced in condensers 30B and 31B is supplied to vaporizer 20B using cycle pump II, 16B and cycle pump I, 15B, respectively where sea water (or other equivalent heating) is supplied thereto via line 18B for providing heat to the liquid working fluid present in vaporizer 20B and producing vaporized working fluid. Condensers 30B and 31B are also supplied with LNG using pump 40B so that the LNG is pressurized to a relatively high pressure e.g. about 80 bars. As can be seen from FIG. 7, the LNG is supplied first of all to condenser 30B for condensing the relatively low pressure organic working fluid vapor exiting turbine 25B and thereafter, the heated LNG exiting condenser 30B is supplied to condenser 31B for condensing the relatively higher pressure organic working fluid vapor extracted from turbine 25B. Thus, in accordance with this embodiment of the present invention, the supply rate or mass flow of the working fluid in the bleed cycle, i.e. line 26, condenser 31B and cycle pump I, 15B, can be increased so that additional power can be produced. Thereafter, the further heated LNG exiting condenser 31B is preferably supplied to heater 36B for producing LNG vapor which may held in storage 42B or, alternatively, be delivered by through line 43B to a pipeline for distribution of vaporized LNG to end users. While only one turbine is shown in FIG. 7, if preferred, two separate turbine modules, i.e. a high pressure turbine module and a low pressure turbine module, can be used.

In an alternative version (see FIG. 7A) of the last mentioned embodiment, direct-contact condenser/heater 32B' can be used together with condensers 30B' and 31B'. By using direct-contact condenser/heater 32B', it is ensured that the working fluid supplied to vaporizer 20B' will not be cold and thus there will be little danger of freezing sea water or heating medium in the vaporizer. In addition, the mass flow of the working fluid in the power cycle can be further increased thereby permitting an increase in the power produced. Furthermore, thereby, the dimensions of the turbine at e.g. its first stage can be improved, e.g. permit the use of blades having a larger size. Consequently, the turbine efficiency is increased.

In a still further alternative version (see FIG. 7B) of the embodiment described with reference to FIG. 7, reheater 22B" is included and used in conjunction with direct-contact condenser/heater 32B" and condensers 30B" and 31B". By including the reheater, the wetness of the vapors exiting high-pressure turbine module 24B" will be substantially reduced or eliminated thus ensuring that the vapors supplied to low-pressure turbine module 25B are substantially dry so that effective expansion and power production can be achieved. If preferred, one heat source can be used for providing heat for the vaporizer while another heat source can be provided for supplying for the reheater.

Figure 7A:
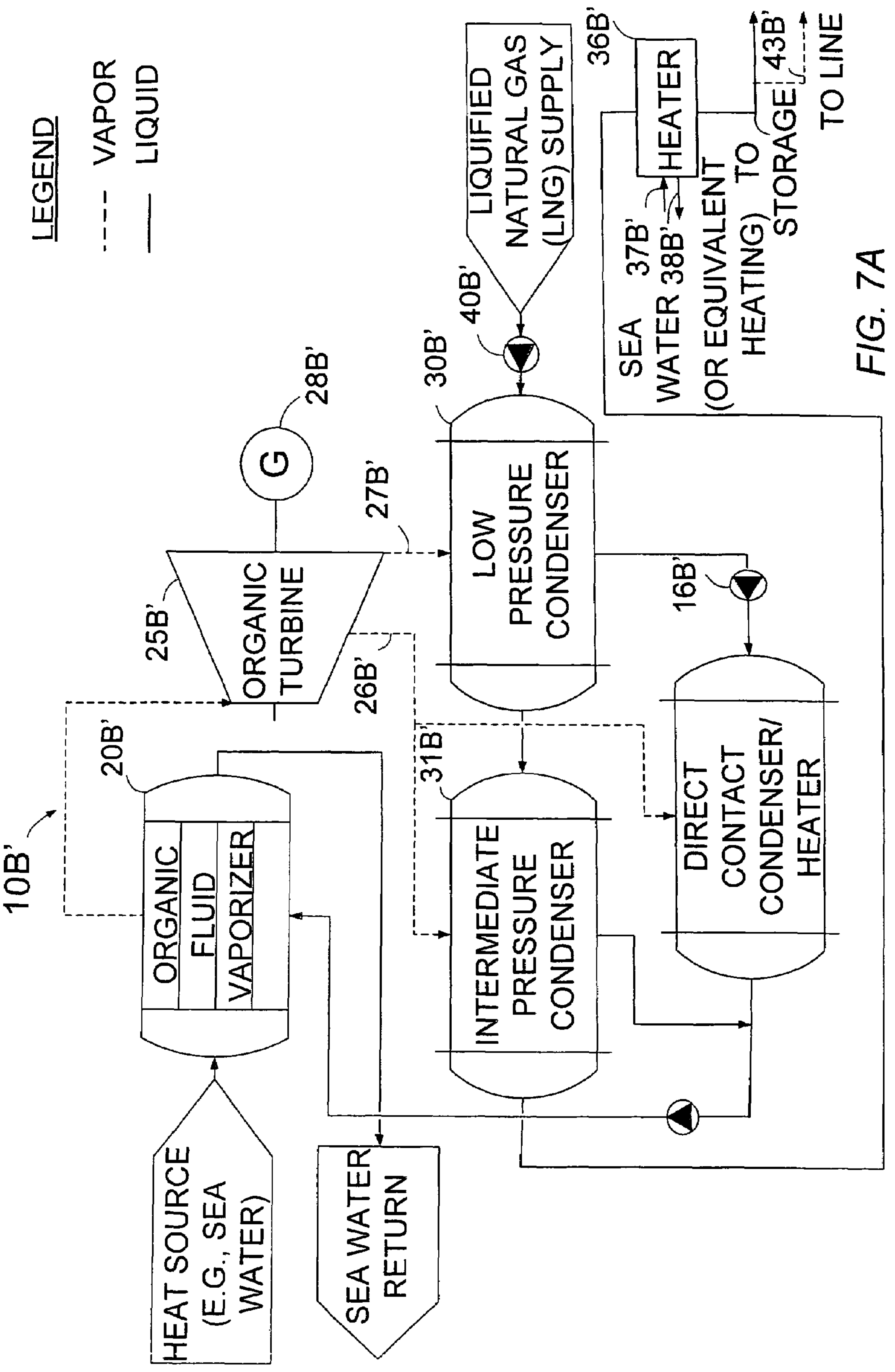
FIG. 7A is a schematic arrangement of an alternative version of the two pressure level closed cycle power system in accordance with the embodiment of the invention shown in FIG. 7.
Figure 7B:
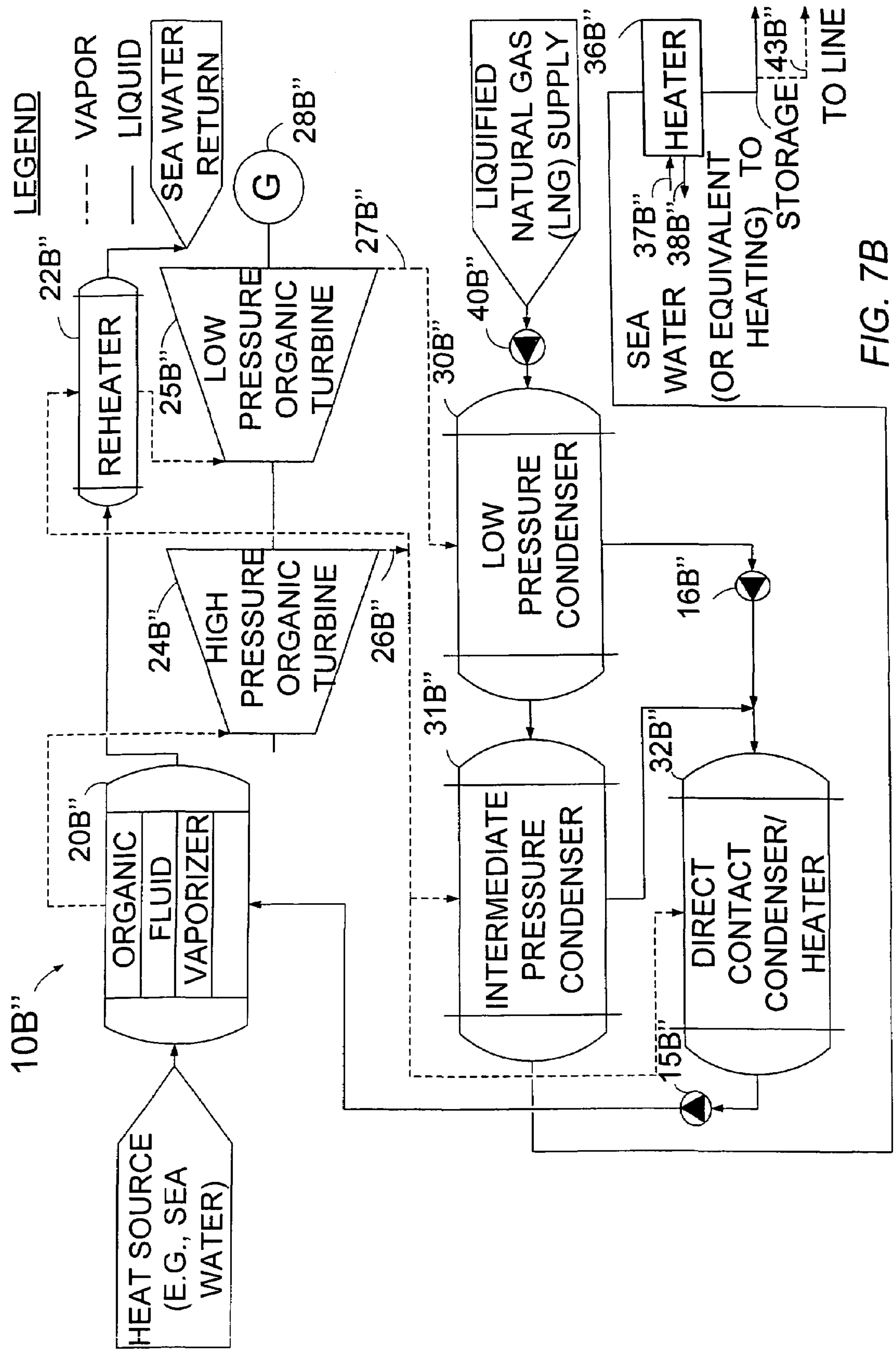
FIG. 7B is a schematic arrangement of a further alternative version of the two pressure level closed cycle power system in accordance with the embodiment of the invention shown in FIG. 7.

In both alternatives described with reference to FIG. 7A or 7B, the position of direct contact condenser/heaters 32B' and 82B" can be changed such that the inlet of direct contact condenser/heaters 32B' can receive working fluid condensate exiting intermediate pressure condenser 31B' (see FIG. 7A) while direct contact condenser/heaters 32B" can receive pressurized working fluid condensate exiting cycle pump 16B" (see FIG. 7B).

Figure 7C:
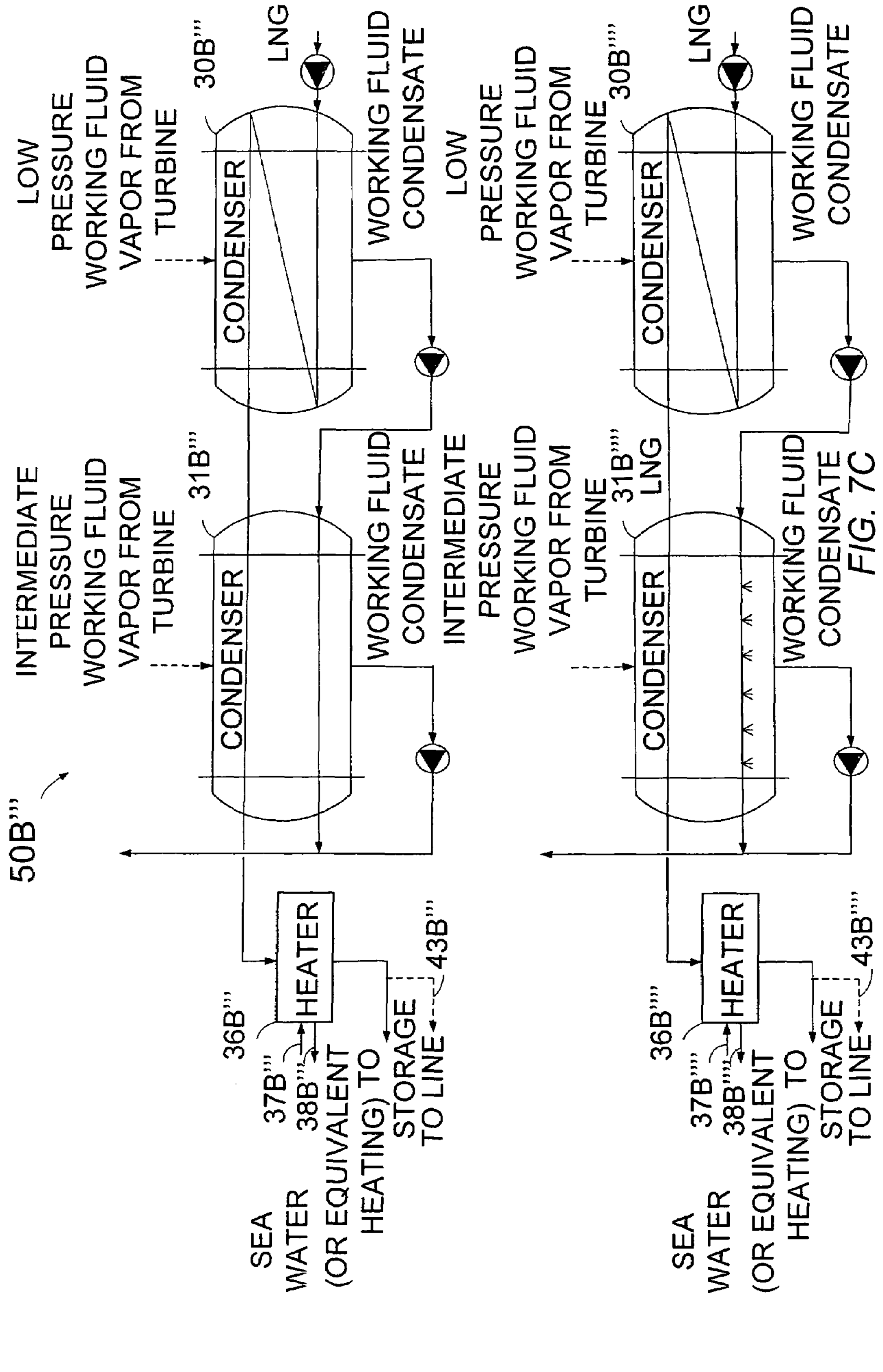
FIG. 7C is a schematic arrangement of further alternative versions of the two pressure level closed cycle power system in accordance with the embodiment of the invention shown in FIG. 7.

In an additional alternative version (see FIG. 7C) of the embodiment described with reference to FIG. 7, condensate produced in low pressure condenser 30B'" (or low pressure condenser 30B"") can also be supplied to intermediate pressure condenser 31B'" (intermediate pressure condenser 31B"") to produce condensate from intermediate pressure vapor extracted from an intermediate stage of the turbine by indirect or direct contact respectively.

Figure 7D:
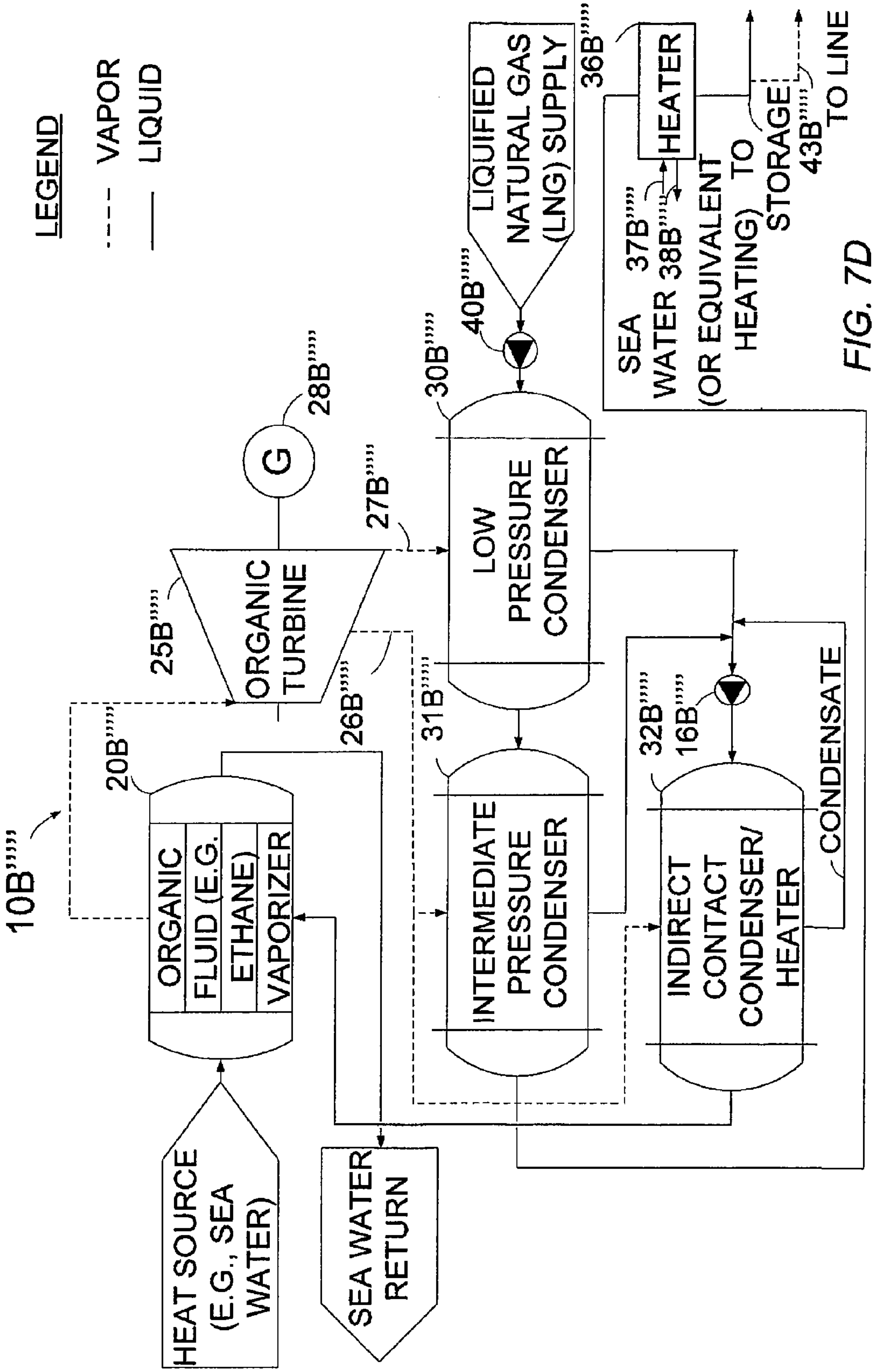
FIG. 7D is a schematic arrangement of a further alternative version of the two pressure level closed cycle power system in accordance with the embodiment of the invention shown in FIG. 7.

FIG. 7D shows a still further alternative version of the embodiment described with reference to FIG. 7 wherein rather than using a direct contact condenser/heater, an indirect condenser/heater is used. In this alternative, only one cycle pump can be used wherein suitable valves can be used in the intermediate pressure condensate lines.

Figure 7E:
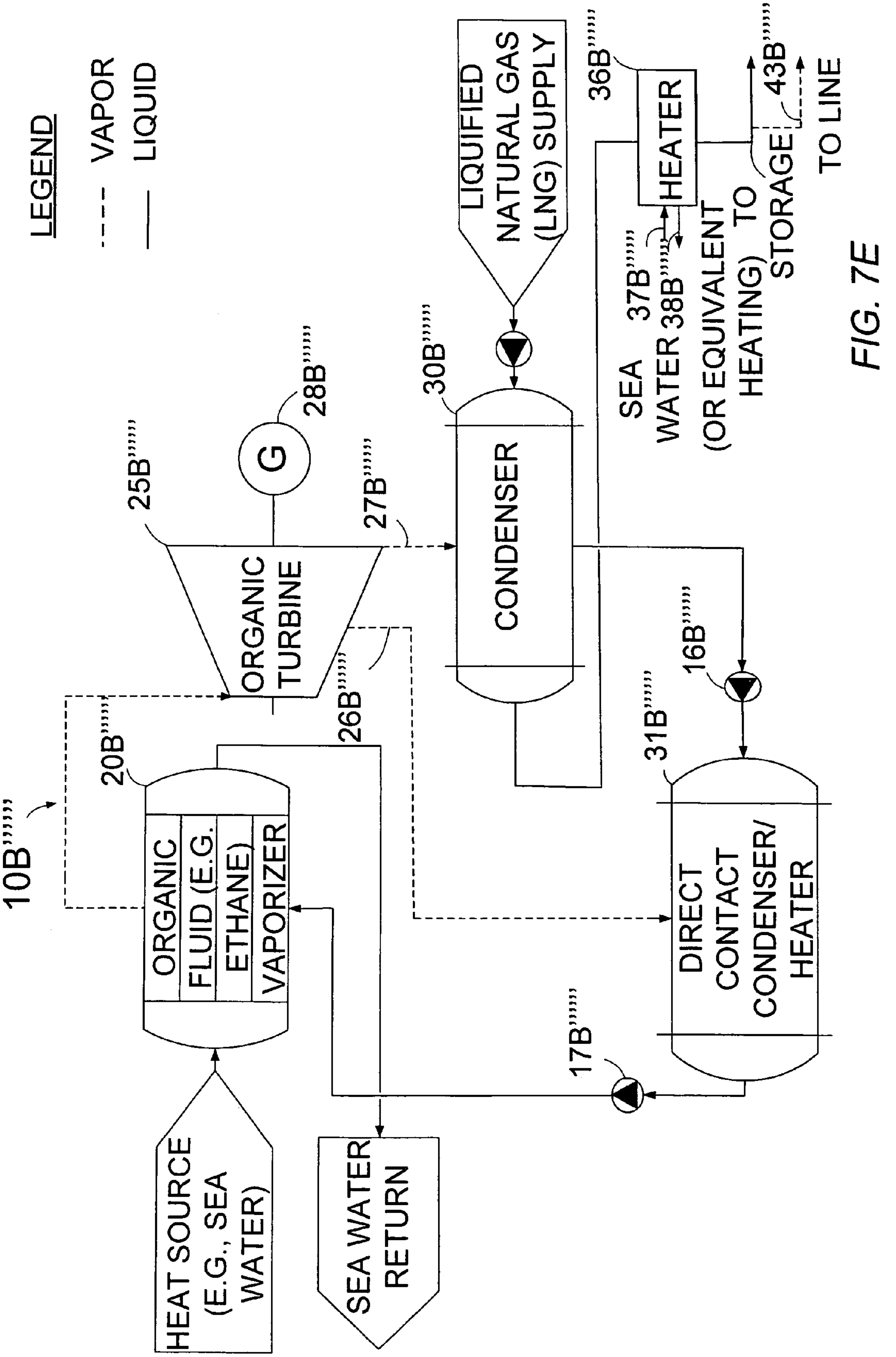
FIG. 7E is a schematic arrangement of a further alternative version of the two pressure level closed cycle power system in accordance with the embodiment of the invention shown in FIG. 7.

In an alternative shown in FIG. 7E, only one indirect condenser using LNG is used while a direct contact condenser/heater is also used.

In an additional embodiment of the present invention (see FIG. 7F), numeral 50A designates an open cycle power plant wherein portion of the LNG is drawn off the main line 61A of the LNG via line 62A and cycled through a turbine for producing power. In this embodiment, two direct contact condenser/heaters are used for condensing vapor extracted and exiting the turbine respectively using pressurized LNG pressurized by pump 65A prior to supply to the direct contact condenser/heaters.

Figure 7F:
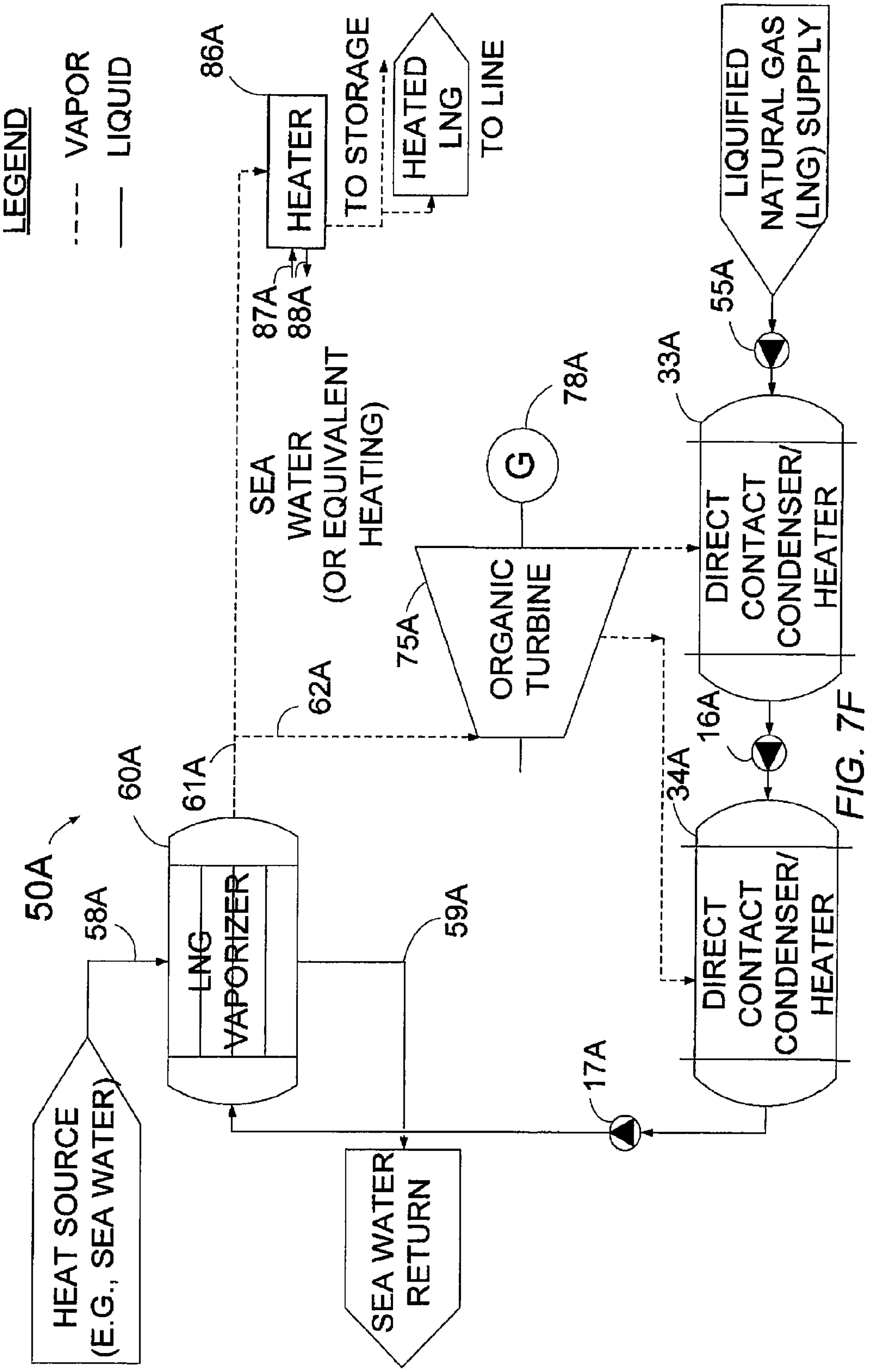
FIG. 7F is a schematic arrangement of a further embodiment of a two pressure level open cycle power system in accordance with the present invention.
Figure 7G:
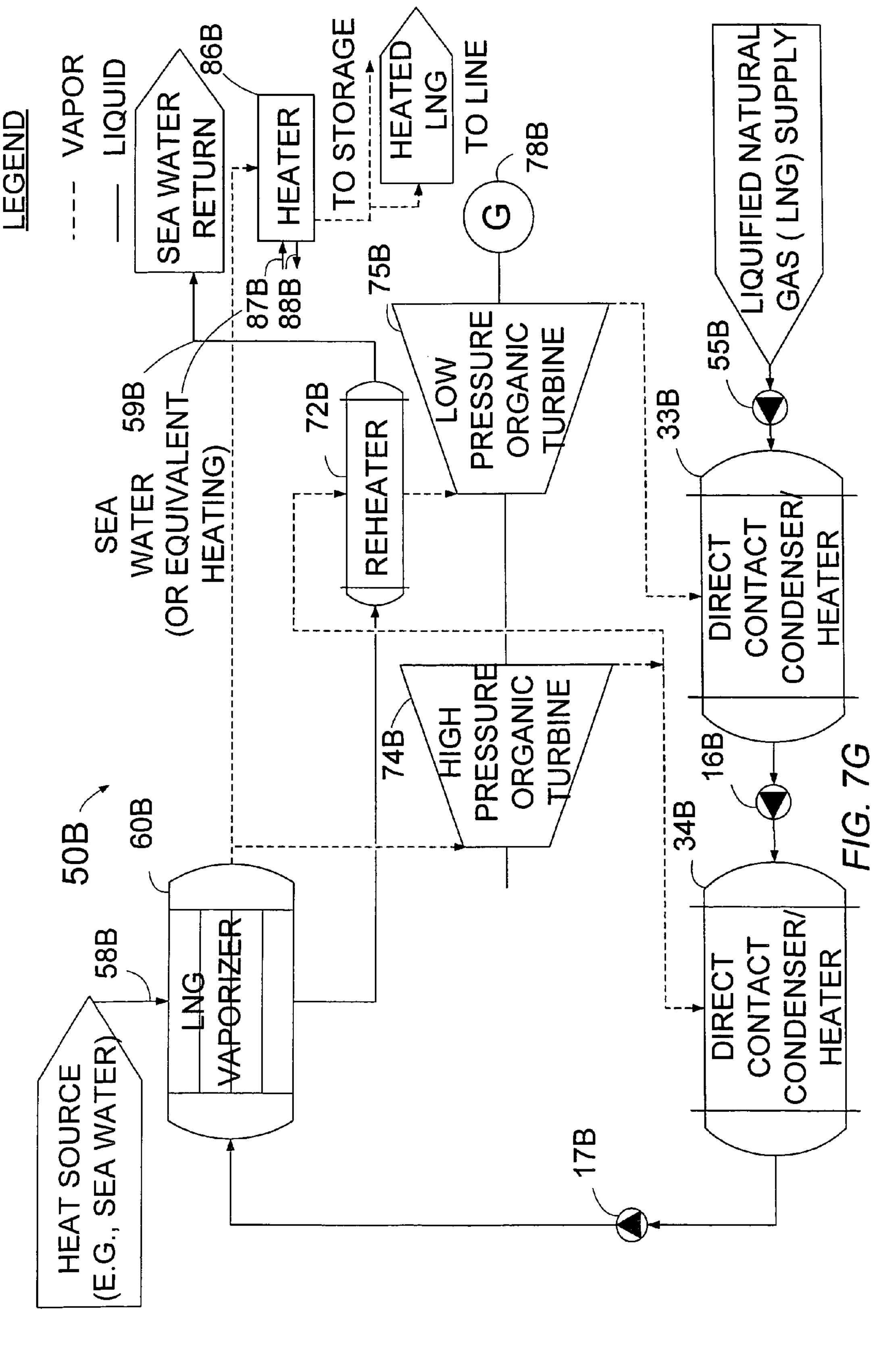
FIG. 7G is a schematic arrangement of a further alternative version of the two pressure level open cycle power system in accordance with the embodiment of the invention shown in FIG. 7F.

In an alternative version, designated 50B in FIG. 7G, of the embodiment described with reference to FIG. 7F using an open cycle power plant, reheater 72B is included and used in conjunction with direct-contact condenser/heaters 31B and 33B. By including the reheater, the wetness of the vapors exiting high-pressure turbine module 64B will be substantially reduced or eliminated thus ensuring that the vapors supplied to low-pressure turbine module 65B are substantially dry so that effective expansion and power production can be achieved. If preferred, one heat source can be used for providing heat for the vaporizer while another heat source can be provided for supplying for the reheater.

Figure 7H:
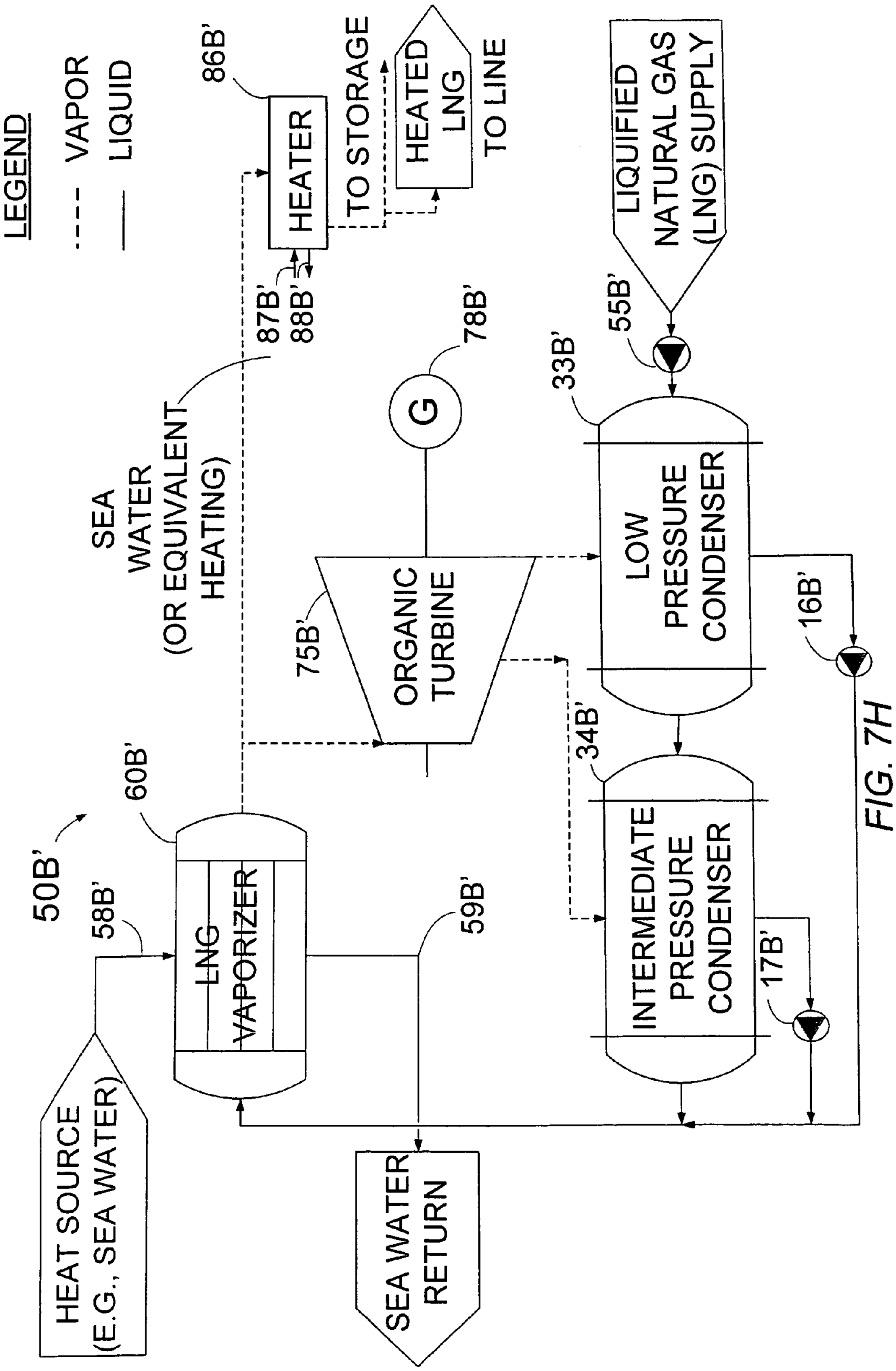
FIG. 7H is a schematic arrangement of a further alternative version of the two pressure level open cycle power system in accordance with the embodiment of the invention shown in FIG. 7F.
Figure 7I:
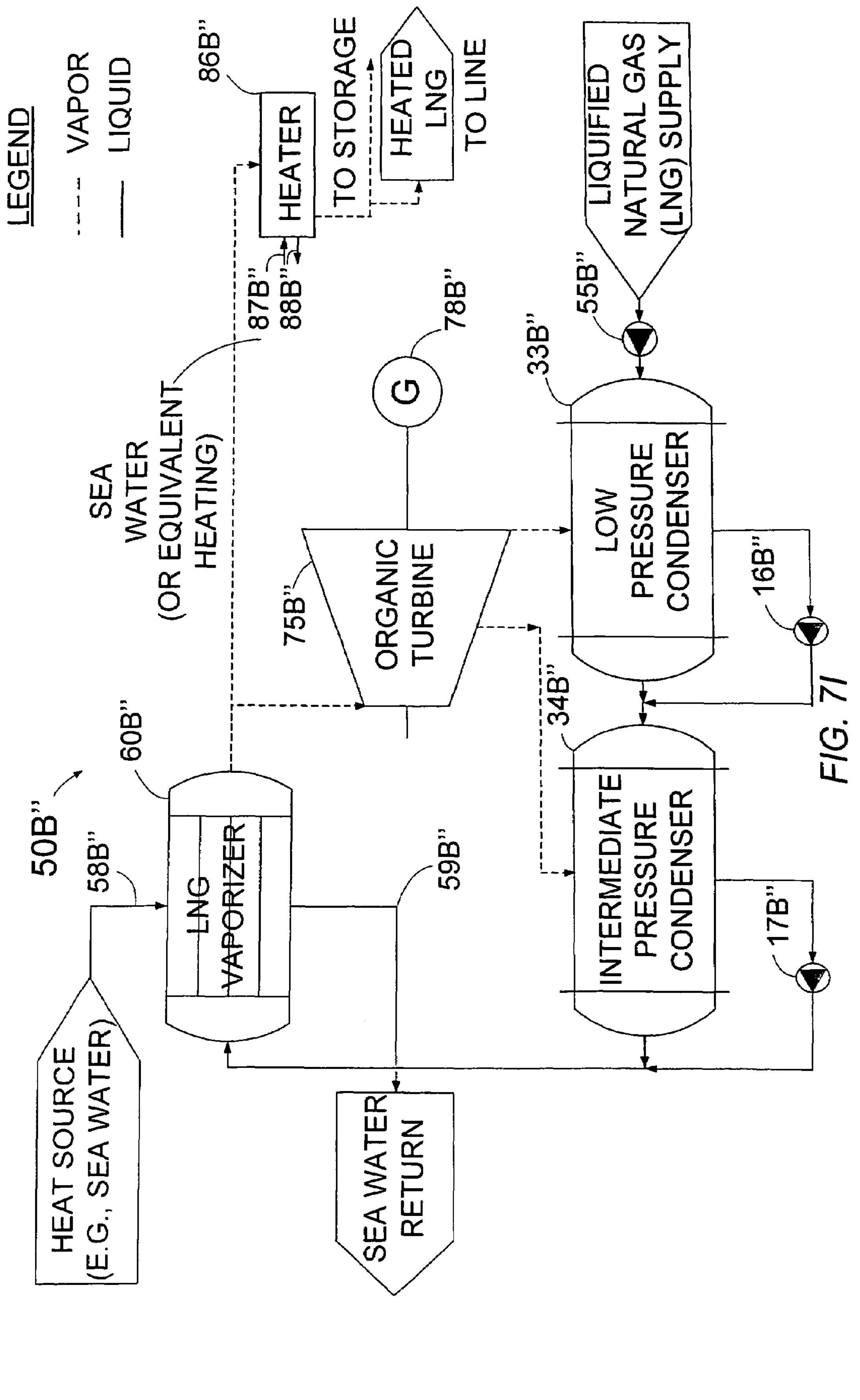
FIG. 7I is a schematic arrangement of a further alternative version of the two pressure level open cycle power system in accordance with the embodiment of the invention shown in FIG. 7F.

In a still further alternative option of the embodiment described with reference to FIG. 7F wherein an open cycle power plant is used, two indirect contact condensers can be used rather than the direct contact condensers used in the embodiment described with reference to FIG. 7F. Two different configurations for the two indirect contact condensers can be used (see FIGS. 7H and 7I).

Figure 7J:
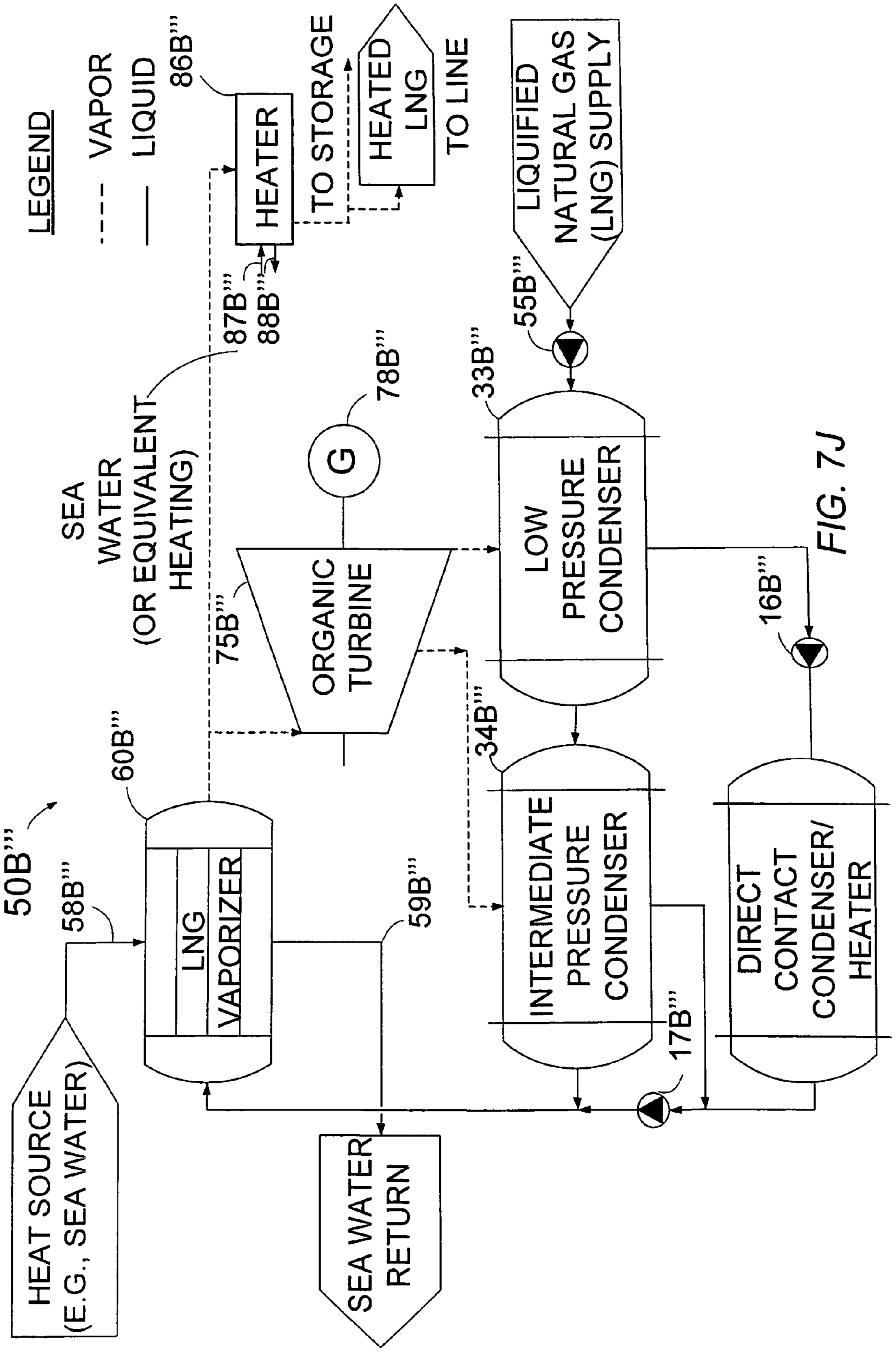
FIG. 7J is a schematic arrangement of a further alternative version of the two pressure level open cycle power system in accordance with the embodiment of the invention shown in FIG. 7F.

In an additional alternative option of the embodiment described with reference to FIG. 7F wherein an open cycle power plant is used, an additional direct contact condenser/heater can be used in addition to the two indirect contact condensers (see FIG. 7J).

Figure 7K:
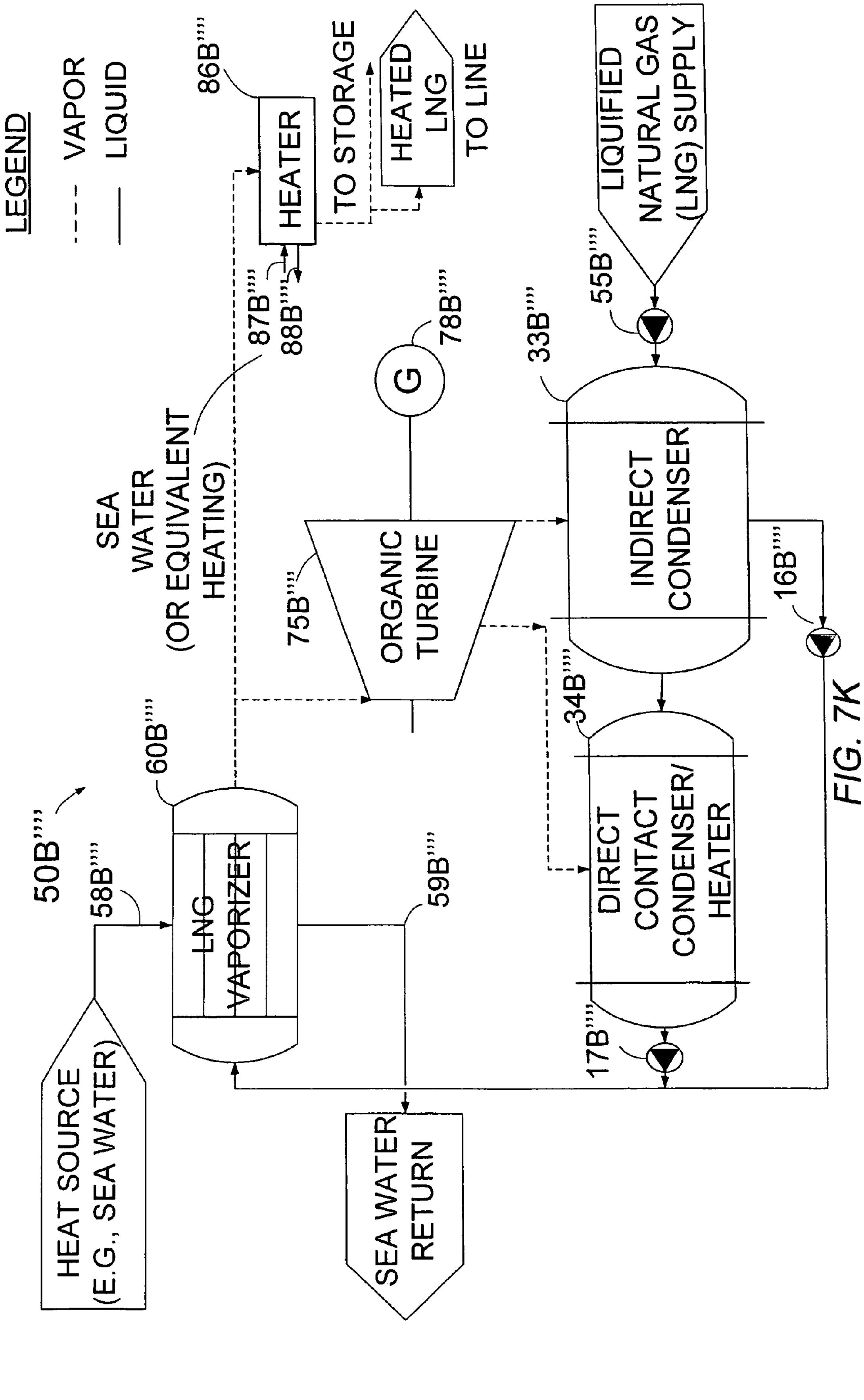
FIG. 7K is a schematic arrangement of a further alternative version of the two pressure level open cycle power system in accordance with the embodiment of the invention shown in FIG. 7F.

Furthermore, if preferred, in a further alternative option, see FIG. 7K, of the embodiment described with reference to FIG. 7F wherein an open cycle power plant is used, one direct contact condenser and one indirect contact condenser can be used.

Figure 7L:
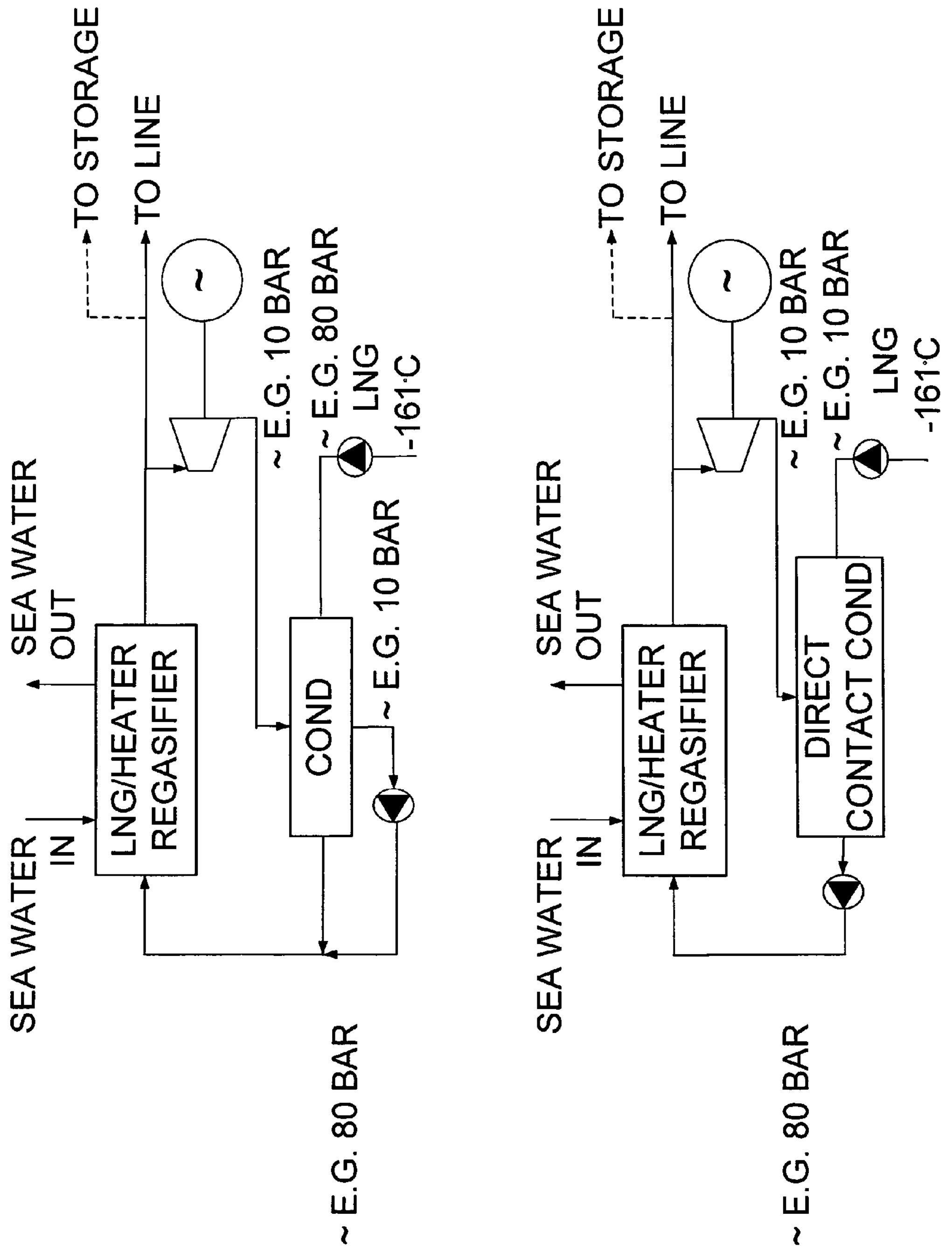
FIG. 7L is a schematic arrangement of further embodiments of an open cycle power system in accordance with the present invention.

Moreover, in a further embodiment, if preferred, in an open cycle power plant, one direct contact condenser or one indirect contact condenser can be used (see FIG. 7L).

Figure 7M:
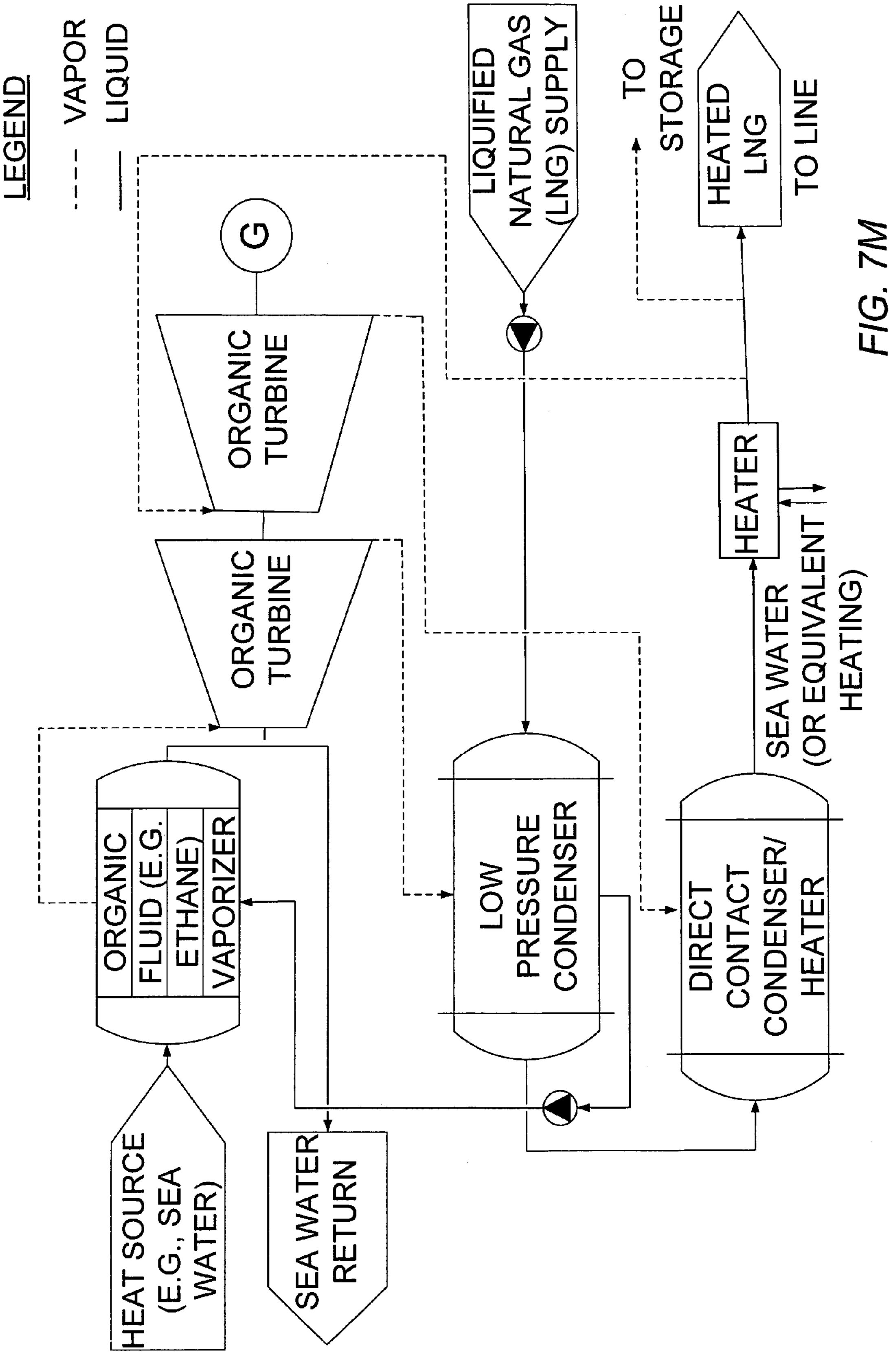
FIG. 7M is a schematic arrangement of a further embodiment of the present invention including an closed cycle power plant and an open cycle power plant.

In addition, in a further embodiment, if preferred, an open cycle power plant and closed cycle power plant can be combined (see FIG. 7M). In this embodiment, any of the described alternatives can be used as part of the open cycle power plant portion and/or closed cycle power plant portion.

Furthermore, it should be pointed out that, if preferred, the components of the various alternatives can be combined. Furthermore, also if preferred, certain components can be omitted from the alternatives. Additionally, an alternative used in a closed cycle power plant can be used in an open cycle power plant. E.g. the alternative described with reference to FIG. 7C (closed cycle power plant) can be used in an open cycle power plant (e.g. condensers 30B''' and 31B''' can be used in stead of condeners 33B' and 34B' shown in FIG. 7H, condensers 30B'''' and 31B'''' can be used in stead of condeners 33B' and 34B' shown in FIG. 7H).

In addition, while two pressure levels are described herein, if preferred, several or a number of pressure levels can be used and, if preferred, an equivalent number of condensers can be used to provide effective use of the pressurized LNG as a cold sink or source for the power cycles.

Figure 8:
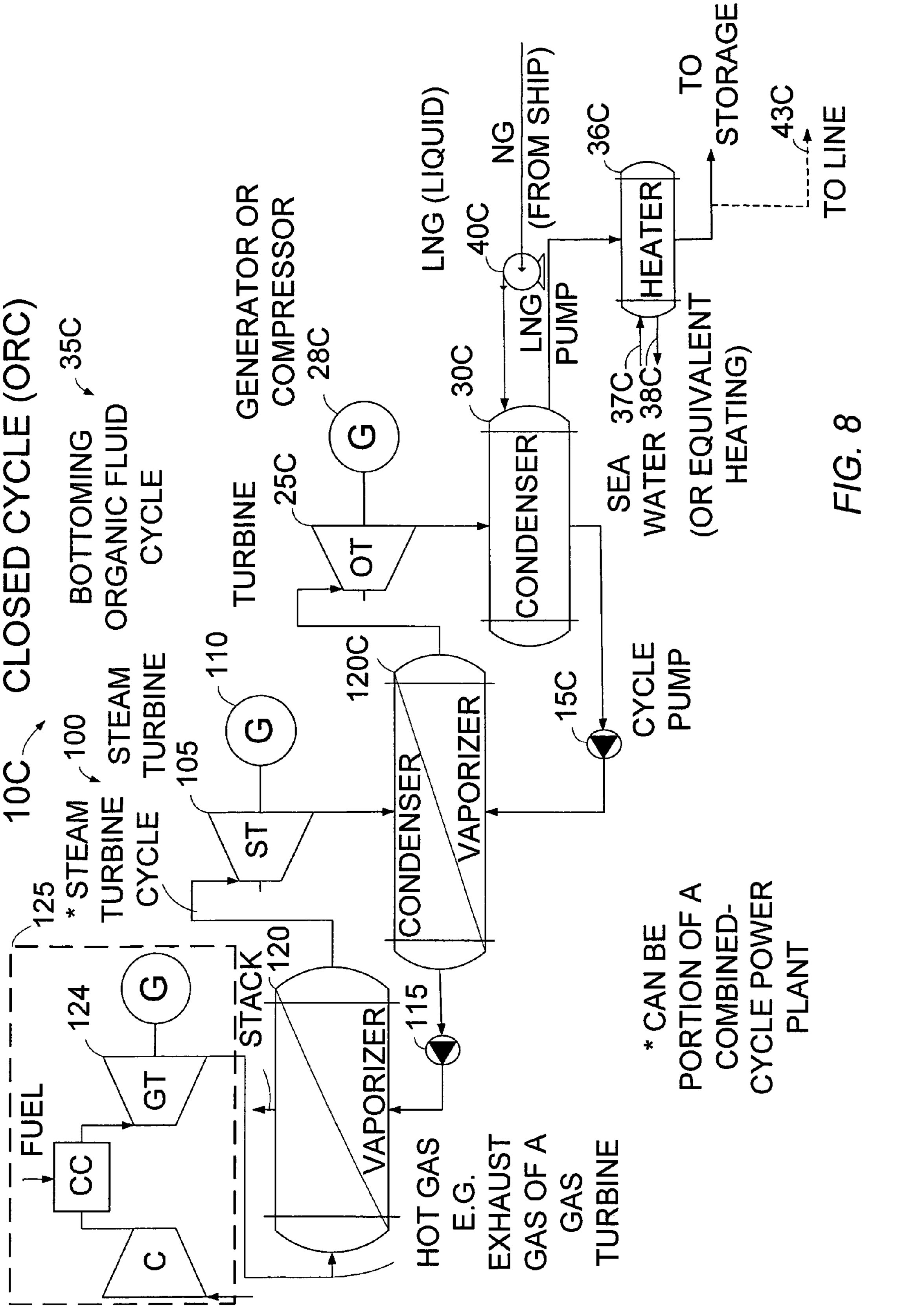
FIG. 8 is a schematic arrangement of a closed cycle power system in accordance with a further embodiment of the invention.

In FIG. 8, a further embodiment of the present invention is shown wherein a closed organic Rankine cycle power system is used. Numeral 10C designates a power plant system including steam turbine system 100 as well closed is used as well as organic Rankine cycle power system 35C. Also here LNG pump 40C is preferably used for pressurizing the LNG prior to supplying it to condenser 30C to a pressure, e.g. about 80 bar, for producing a pressure for the re-gasified LNG suitable for supply via line 43C to a pipeline for distribution of vaporized LNG to end users. In this embodiment, the preferred organic working fluid is ethane or equivalent. Preferably in this embodiment, power plant system 10C includes, in addition, gas turbine unit 125 the exhaust gas of which providing the heat source for steam turbine system 100. In such a case, as can be seen from FIG. 8, the exhaust gas of gas turbine 124 is supplied to vaporizer 120 for producing steam from water contained therein. The steam produced is supplied to steam turbine 105 where it expands and produces power and preferably drives electric generator 110 generating electricity. The expanded steam is supplied to steam condenser/vaporizer 120C where steam condensate is produced and cycle pump 115 supplies the steam condensate to vaporizer 120 thus completing the steam turbine cycle. Condenser/vaporizer 120C also acts as a vaporizer and vaporizes liquid organic working fluid present therein. The organic working fluid vapor produced is supplied to organic vapor turbine 25C and expands therein and produces power and preferably drives electric generator 28C that generates electricity. Preferably, turbine 25C rotates at 1500 RPM or 1800 RPM. Expanded organic working fluid vapor exiting organic vapor turbine is supplied to condenser 30C where organic working fluid condensate is produced by pressurized LNG supplied thereto by LNG pump 40C. Cycle pump 15C supplies the organic working fluid condensate from condenser 30C to condenser/vaporizer 120C. Pressurized LNG is heated in condenser 30C and preferably heater 86C further the pressurized LNG so that re-gasified LNG is produced for storage or supply via a pipeline for distribution of vaporized LNG to end users. Due to pressurizing of the LNG prior to supplied the LNG to the condenser, it can be advantageous to use a propane/ethane mixture as the organic working fluid of the organic Rankine cycle power system rather than ethane mentioned above. On the other hand, if preferred ethane, ethene or equivalent can be used as the working fluid while two condensers or other configurations mentioned above can be used in the organic Rankine cycle power system.

Figure 9:
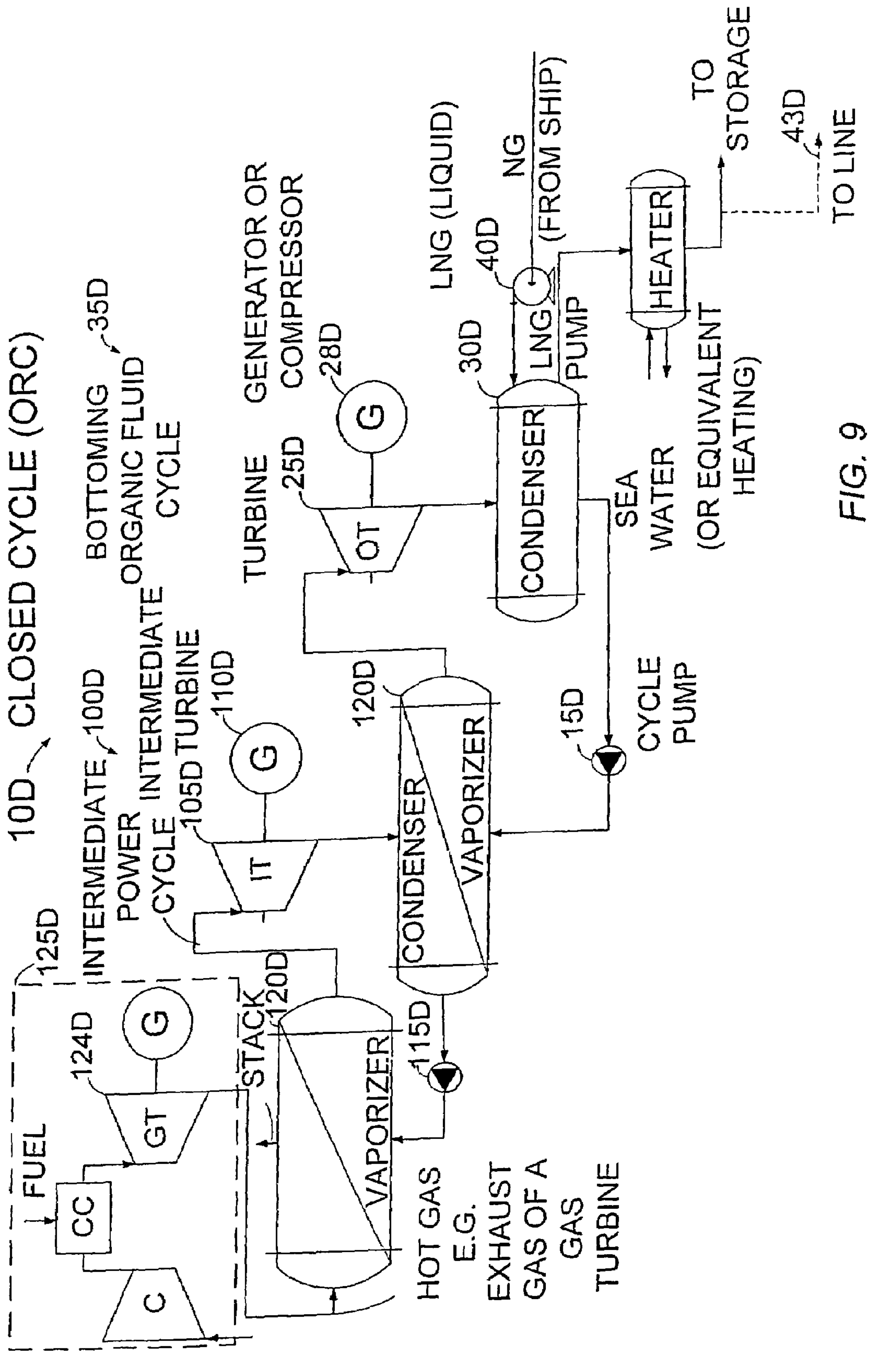
FIG. 9 is a schematic arrangement of a closed cycle power system in accordance with a still further embodiment of the invention. Similar reference numerals and symbols refer to similar components.

1. Turning to FIG. 9, a further embodiment of the present invention is shown wherein a closed organic Rankine cycle power system is used. Numeral 10D designates a power plant system including intermediate power cycle system 100D as well as closed organic Rankine cycle power system 35D. Also here LNG pump 40D is preferably used for pressurizing the LNG prior to supplying it to condenser 30D to a pressure, e.g. about 80 bar, for producing a pressure for the re-gasified LNG suitable for supply via line 43D to a pipeline for distribution of vaporized LNG to end users. In this embodiment, the preferred organic working fluid is ethane, ethene or equivalent. Preferably, in this embodiment, power plant system 10D includes gas turbine unit 125D the exhaust gas of which providing the heat source for intermediate heat transfer cycle system 100D. In such a case, as can be seen from FIG. 9, the exhaust gas of gas turbine 124D is supplied to an intermediate cycle 100D for transferring heat from the exhaust gas of the vaporizer 120D for producing intermediate fluid vapor from intermediate fluid liquid contained therein. The vapor produced is supplied to intermediate vapor turbine 105D where it expands and produces power and preferably drives electric generator 110D generating electricity. Preferably, turbine 25D rotates at 1500 RPM or 1800 RPM. The expanded vapor is supplied to vapor condenser/vaporizer 120D where intermediate fluid condensate is produced and cycle pump 115D supplies the intermediate fluid condensate to vaporizer 120 thus completing the intermediate fluid turbine cycle. Several working fluids are suitable for use in the intermediate cycle. An example of such a working fluid is pentane, i.e. n-pentane or iso-pentane. Condenser/vaporizer 120D also acts as an vaporizer and vaporizes liquid organic working fluid present therein. The organic working fluid vapor produced is supplied to organic vapor turbine 25D and expands therein and produces power and preferably drives electric generator 28D that generates electricity. Expanded organic working fluid vapor exiting organic vapor turbine is supplied to condenser 30D where organic working fluid condensate is produced by pressurized LNG supplied thereto by LNG pump 40D. Cycle pump 15D supplies the organic working fluid condensate from condenser 30D to condenser/vaporizer 120D. Pressurized LNG is heated in condenser 30D and preferably heater 36D further the pressurized LNG so that re-gasified LNG is produced for storage or supply via a pipeline for distribution of vaporized LNG to end users. Due to pressurizing of the LNG prior to supplied the LNG to the condenser, it can be advantageous to use a propane/ethane mixture as the organic working fluid of the organic Rankine cycle power system rather than ethane mentioned above. On the other hand, if preferred ethane, ethene or equivalent can be used as the working fluid while two condensers or other configurations mentioned above can be used in the organic Rankine cycle power system. Furthermore, a heat transfer fluid such as thermal oil or other suitable heat transfer fluid can be used for transferring heat from the hot gas to the intermediate fluid and, if preferred, a heat transfer fluid such as an organic, alkylated heat transfer fluid e.g. a synthetic alkylated aromatic heat transfer fluid. Examples can be an alkyl substituted aromatic fluid, Therminol LT, of the Solutia company having a center in Belgium or a mixture of isomers of an alkylated aromatic fluid, Dowterm J, of the Dow Chemical Company. Also other fluids such as hydrocarbons having the formula $C_nH_{2n+2}$ wherein n is between 8 and 20 can also be used for this purpose. Thus, iso-dodecane or 2,2,4,6,6-pentamethylheptane, iso-eicosane or 2,2,4,4,6,6,8,10,10-nonamethylundecane, iso-hexadecane or 2,2,4,4,6,8,8-heptamethylnonane, iso-octane or 2,2,4 trimethylpentane, iso-nonane or 2,2,4,4 tetramethylpentane and a mixture of two or more of said compounds can be used for such a purpose, in accordance with U.S. patent application Ser. No. 11/067,710, the disclosure of which is hereby incorporated by reference. When an organic, alkylated heat transfer fluid is used as the heat transfer fluid, it can be used to also produce power or electricity by e.g. having vapors produced by heat in the hot gas expand in a turbine, with the expanded vapors exiting the turbine being condensed in a condenser which is cooled by intermediate fluid such that intermediate fluid vapor is produced which is supplied to the intermediate vapor turbine.

Furthermore, any of the alternatives described herein can be used in the embodiments described with reference to FIG. 8 or FIG. 9.

While in the embodiments and alternatives described above it is stated that the preferred rotational speed of the turbine is 1500 or 1800 RPM, if preferred, in accordance with the present invention, other speeds can also be used, e.g. 3000 or 3600 RPM.

If preferred, the methods of the present invention can also be used to cool the inlet air of a gas turbine and/or to carry out intercooling in an intermediate stage or stages of the compressor of a gas turbine. Furthermore, if preferred, the methods of the present invention can be used such that LNG after cooling and condensing the working fluid can be used to cool the inlet air of a gas turbine and/or used to carry out intercooling in an intermediate stage or stages of the compressor of a gas turbine.

Furthermore, it should be pointed out that, if preferred, steam turbine system 100 described with reference to FIG. 8 can be a condensing steam turbine system.

While methane, ethane, ethene or equivalents are mentioned above as the preferred working fluids for the organic Rankine cycle power plants they are to be taken as non-limiting examples of the preferred working fluids. Thus, other saturated or unsaturated aliphatic hydrocarbons can also be used as the working fluid for the organic Rankine cycle power plants. In addition, substituted saturated or unsaturated hydrocarbons can also be used as the working fluids for the organic Rankine cycle power plants. Trifluromethane ($CHF_3$), fluromethane ($CH_3F$), tetrafluroethane ($C_2F_4$ and hexafluroethane ($C_2F_6$) are also preferred working fluids for the organic Rankine cycle power plants described herein. Furthermore, such Chlorine (Cl) substituted saturated or unsaturated hydrocarbons can also be used as the working fluids for the organic Rankine cycle power plants but would not be used due to their negative environmental impact.

Auxiliary equipment (e.g. values, controls, etc.) are not shown in the figures for sake of simplicity.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A thermodynamic system utilizing energy in a liquified low temperature organic fluid which is gaseous at ambient temperature and pressure, comprising:

a closed thermodynamic cycle using an organic working fluid, said closed thermodynamic cycle including a vaporizer for vaporizing the organic working fluid, an expander for expanding the vaporized organic working fluid, a condenser/heater connected for condensing vapors extracted from an intermediate stage of said expander, and a condenser connected for condensing the expanded organic working fluid from a lower pressure stage of said expander and supplying the condensate therein to the condenser/heater;

means connected to the expander for utilizing the energy of expansion of the vaporized organic working fluid;

a source of a liquified low temperature organic fluid which is gaseous at ambient temperature and pressure; and means for regasifying the liquified low temperature organic fluid, the means for regasifying including the condenser, wherein the liquified low temperature organic fluid comprises a heat sink for absorbing heat from the condensing organic working fluid.

2. A closed organic Rankine cycle regasification system for liquefied natural gas (LNG), comprising:

a) a vaporizer in which liquid working fluid is vaporized, said liquid working fluid being a working fluid liquefied by the LNG;

b) a turbine for expanding the vaporized working fluid;

c) a condenser to which expanded working fluid vapor is supplied, said condenser also being supplied with LNG for receiving heat from said expanded fluid vapor wherein said LNG condenses said expanded working fluid exiting the turbine and whereby the temperature of the LNG increases as it flows through the condenser;

d) a condenser/heater for condensing vapors extracted from an intermediate stage of said turbine and heating working fluid condensate supplied to said condenser/heater from said condenser;

e) a line through which said working fluid is supplied from the outlet of the condenser to the inlet of the vaporizer; and f) a line for transmitting regasified LNG.

3. The system according to claim 2, wherein the working fluid comprises a working fluid selected from the group consisting of ethane and methane.

4. The system according to claim 2, wherein the working fluid is a mixture of propane and ethane.

5. The system according to claim 2, wherein the power system further includes an open cycle power system such that the working fluid therein is LNG, having a heat exchanger means for condensing the LNG exiting the turbine of open cycle power system and heating the LNG supplied to the system.

6. The system according to claim 2, wherein the heat source of the vaporizer is sea water.

7. The system according to claim 3, wherein the heat source of the vaporizer comprises steam exiting a steam turbine wherein said steam turbine is a portion of a combined cycle power plant.

8. The system according to claim 3, further comprising an intermediate fluid system for transferring heat from the heat source to said working fluid, wherein said intermediate fluid system transfers heat from the intermediate fluid to the working fluid for vaporizing the working fluid.

9. The system according to claim 2, further comprising a pump for pressurizing and delivering liquid working fluid from the condenser to the vaporizer.

10. The system according to claim 2 further comprising a pump for increasing the pressure of the LNG prior to supplying it to said condenser to a pressure that is suitable for supplying the re-gasified LNG along a pipeline to end users.

11. The system according to claim 4 further comprising a pump for increasing the pressure of the LNG prior to supplying it to said condenser to a pressure that is suitable for supplying the re-gasified LNG along a pipeline to end users.

12. The system according to claim 7 further comprising a pump for increasing the pressure of the LNG prior to supplying it to said condenser to a pressure that is suitable for supplying the re-gasified LNG along a pipeline to end users.

13. The system according to claim 10 further comprising a further condenser for condensing expanded vapor extracted from said turbines wherein said further condenser is cooled by heated LNG exiting said condenser.

14. The system according to claim 2 wherein said condenser/heater for condensing vapors extracted from an intermediate stage of said turbine and heating working fluid condensate supplied to said condenser/heater from said condenser comprises an indirect contact condenser/heater.

15. The system according to claim 2 wherein said condenser/heater for condensing vapors extracted from an intermediate stage of said turbine and heating working fluid condensate supplied to said condenser/heater from said condenser comprises a direct contact condenser/heater.

16. The system according to claim 5, wherein said a heat exchanger means for condensing the LNG exiting the turbine of said open cycle power system is cooled by pressurized LNG.

17. The system according to claim 16 further comprising a further heat exchanger means for condensing the LNG extracted from said turbine of open cycle power system with pressurized LNG.

18. The system according to claim 5 wherein said open cycle power system further comprise a condenser/heater for condensing vapors extracted from an intermediate stage of said turbine of open cycle power system and heating LNG supplied to said condenser/heater from said heat exchanger means of said open cycle power system.

19. The system according to claim 1 wherein said system further comprises a condenser/heater for condensing vapors extracted from an intermediate stage of said expander and heating working fluid condensate supplied to said condenser/heater from said condenser1 and wherein said source of a liquified low temperature organic fluid which is gaseous at ambient temperature and pressure comprises a source of liquefied natural gas (LNG).

20. The system according to claim 19, wherein the working fluid comprises a working fluid selected from the group consisting of ethane and methane.

21. The system according to claim 19, wherein the working fluid is a mixture of propane and ethane.

22. The system according to claim 19, wherein the heat source of the vaporizer is sea water.

23. The system according to claim 19 further comprising a pump for increasing the pressure of the LNG prior to supplying it to said condenser to a pressure that is suitable for supplying the re-gasified LNG along a pipeline to end users.

24. The system according to claim 19 further comprising a further comprising a condenser for condensing expanded vapor extracted from said expander wherein said further condenser is cooled by heated LNG exiting said condenser.

25. The system according to claim 19 wherein said condenser/heater for condensing vapors extracted from an intermediate stage of said expander and heating working fluid condensate supplied to said condenser/heater from said condenser comprises an indirect contact condenser/heater.

26. The system according to claim 19 wherein said condenser/heater for condensing vapors extracted from an intermediate stage of said expander and heating working fluid condensate supplied to said condenser/heater from said condenser comprises a direct contact condenser/heater.

27. A method of utilizing energy in a liquified low temperature organic fluid which is gaseous at ambient temperature and pressure, comprising the steps of:

providing a source of a liquified low temperature organic fluid which is gaseous at ambient temperature and pressure;

regasifying the liquified low temperature organic fluid, the regasifying step including a step of supplying the liquified low temperature organic fluid as a cold sink in a condenser of a closed thermodynamic cycle using an organic working fluid, said closed thermodynamic cycle including a vaporizer for vaporizing the organic working fluid, an expander for expanding the vaporized organic working fluid and the condenser for condensing the expanded organic working fluid;

condensing vapors extracted from an intermediate stage of said expander in a condenser/heater and heating working fluid condensate supplied to said condenser/heater from said condenser; and utilizing the energy of expansion of the vaporized organic working fluid.

28. The method according to claim 27 wherein the step of providing said source of a liquified low temperature organic fluid which is gaseous at ambient temperature and pressure comprises providing a source of liquefied natural gas (LNG).

29. The method according to claim 27, wherein the step of supplying the liquified low temperature organic fluid as a cold sink in a condenser of a closed thermodynamic cycle using an organic working fluid is carried out by supplying the liquified low temperature organic fluid as a cold sink in a condenser of a closed thermodynamic cycle using an organic working fluid selected from the group consisting of ethane and methane.

30. The method according to claim 27, wherein the step of supplying the liquified low temperature organic fluid as a cold sink in a condenser of a closed thermodynamic cycle using an organic working fluid is carried out by supplying the liquified low temperature organic fluid as a cold sink in a condenser of a closed thermodynamic cycle using an organic working fluid comprising a mixture of propane and ethane.

31. The method according to claim 27, comprising the step of supplying heat from sea water as a heat source to the vaporizer.

32. The method according to claim 28 further comprising increasing the pressure of the LNG prior to supplying it to said condenser to a pressure that is suitable for supplying the re-gasified LNG along a pipeline to end users using a pump.

33. The method according to claim 27 further comprising the step of providing a further condenser for condensing expanded vapor extracted from said expanders wherein said further condenser is cooled by heated liquified low temperature organic fluid exiting said condenser.

34. The method according to claim 28 wherein the step of condensing vapors extracted from an intermediate stage of said expander in a condenser/heater and heating working fluid condensate supplied to said condenser/heater from said condenser comprises condensing vapors extracted from an intermediate stage of said expander in a indirect contact condenser/heater and heating working fluid condensate supplied to said indirect contact condenser/heater from said condenser.

35. The method according to claim 28 wherein the step of condensing vapors extracted from an intermediate stage of said expander in a condenser/heater and heating working fluid condensate supplied to said condenser/heater from said condenser comprises condensing vapors extracted from an intermediate stage of said expander in a direct contact condenser/heater and heating working fluid condensate supplied to said direct contact condenser/heater from said condenser.

* * * * *

UNITED STATES PATENT AND TRADEMARK OFFICE

CERTIFICATE OF CORRECTION

PATENT NO. : 7,493,763 B2 
APPLICATION NO. : 11/110935
DATED : February 24, 2009
INVENTOR(S) : Marat Klochko et al.

It is certified that error appears in the above-identified patent and that said Letters Patent is hereby corrected as shown below:

Column 11, line 36 in Claim 7, delete "3" and insert --2--;

Column 11, line 41 in Claim 8, delete "3" and insert --2--;

Column 11, line 57 in Claim 12, delete "7" and insert --8--;

Column 11, line 61 in Claim 13, delete "10" and insert --2--;

Column 12, lines 22-26 in Claim 19, delete "wherein said system further comprises a condenser/heater for condensing vapors extracted from an intermediate statge of said expander and heating working fluid condensate supplied to said condenser/heater from said condenser1 and";

Column 12, line 42 in Claim 24, delete "further comprising a."

Signed and Sealed this

Twenty-first Day of April, 2009

JOHN DOLL
*Acting Director of the United States Patent and Trademark Office*